United States Patent
Suzuki

(10) Patent No.: US 10,514,627 B2
(45) Date of Patent: Dec. 24, 2019

(54) IMAGE FORMING APPARATUS AND CONTROL METHOD OF IMAGE FORMING APPARATUS

(71) Applicant: CANON KABUSHIKI KAISHA, Tokyo (JP)

(72) Inventor: Katsunari Suzuki, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/194,753

(22) Filed: Nov. 19, 2018

(65) Prior Publication Data

US 2019/0155184 A1 May 23, 2019

(30) Foreign Application Priority Data

Nov. 20, 2017 (JP) ................. 2017-222716

(51) Int. Cl.
| | |
|---|---|
| G03G 15/04 | (2006.01) |
| G03G 15/043 | (2006.01) |
| H04N 1/047 | (2006.01) |
| H04N 1/50 | (2006.01) |
| G03G 15/00 | (2006.01) |
| G03G 15/32 | (2006.01) |

(52) U.S. Cl.
CPC ..... *G03G 15/04054* (2013.01); *G03G 15/043* (2013.01); *G03G 15/505* (2013.01); *H04N 1/0473* (2013.01); *H04N 1/506* (2013.01); *G03G 15/326* (2013.01)

(58) Field of Classification Search
CPC .......... G03G 15/04054; G03G 15/043; G03G 15/505; G03G 15/326
See application file for complete search history.

(56) References Cited

U.S. PATENT DOCUMENTS

| | | | | |
|---|---|---|---|---|
| 2009/0041503 | A1* | 2/2009 | Yamaguchi | ............. B41J 2/451 399/220 |
| 2011/0052231 | A1* | 3/2011 | Kitao | ................. G03G 15/0131 399/49 |
| 2014/0233990 | A1* | 8/2014 | Hayashi | ............. G03G 15/0189 399/301 |

FOREIGN PATENT DOCUMENTS

JP  2014-108546 A  6/2014

* cited by examiner

*Primary Examiner* — Joseph S Wong
(74) *Attorney, Agent, or Firm* — Venable LLP

(57) ABSTRACT

An image forming apparatus including a photoconductor and a light emitting unit further includes a generating unit configured to generate correction data used for correcting a shift in the sub-scanning direction of a latent image to be formed on the photoconductor; a correcting unit configured to correct image data based on the correction data; and a control unit configured to control light emission of the light emitting unit so as to form the latent image on the photoconductor. The generating unit is configured to generate the correction data based on configuration information of the light emitting unit, information indicating time required for causing a plurality of light emitting elements to emit light, and information indicating a rotation speed of the photoconductor.

16 Claims, 14 Drawing Sheets

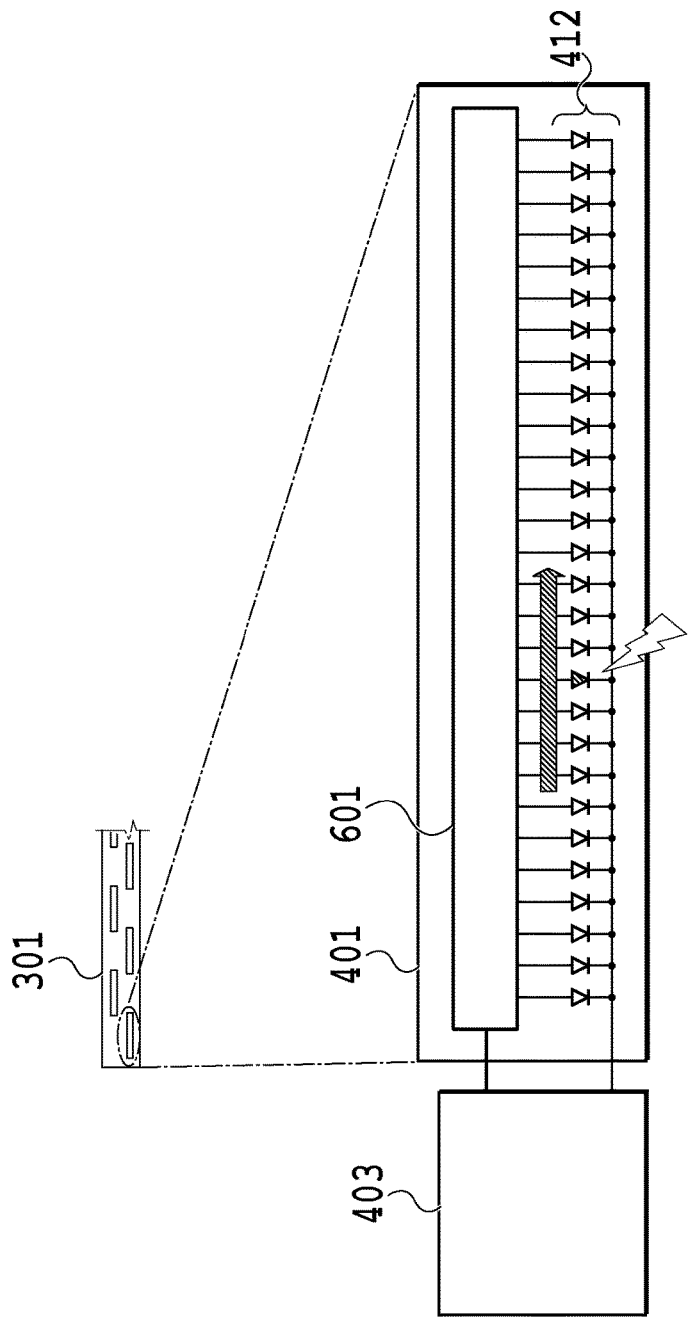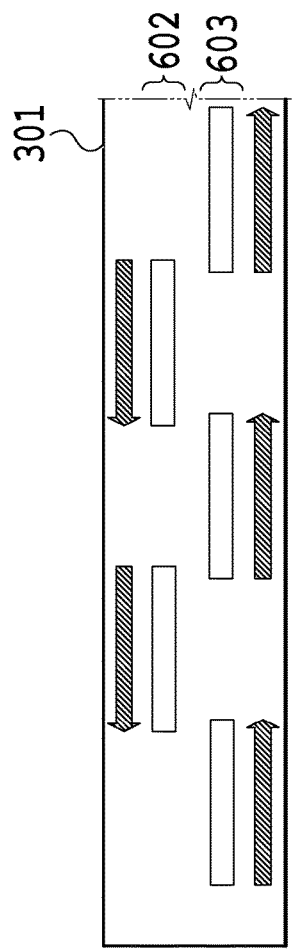

IDEAL INSTALLATION STATE

INCLINATION $\psi$

INSTALLATION STATE WITH INCLINED EXPOSURE HEAD

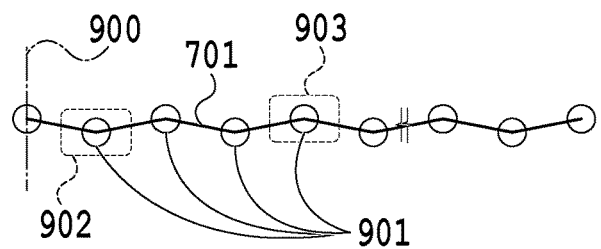
FIG.9A
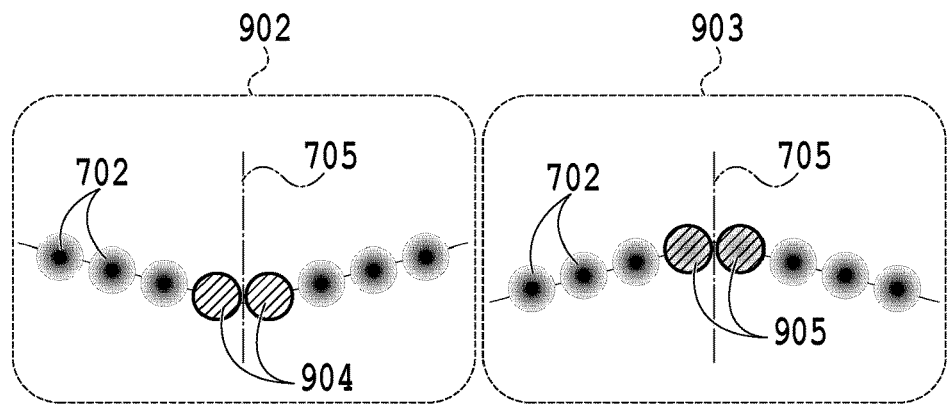
FIG.9B  FIG.9C
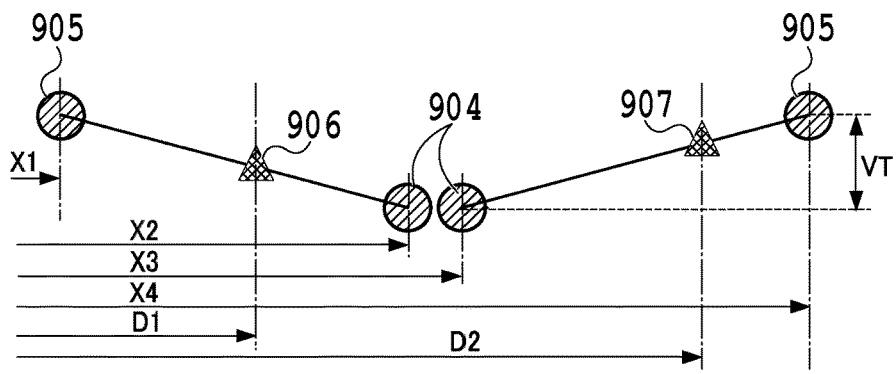
FIG.9D
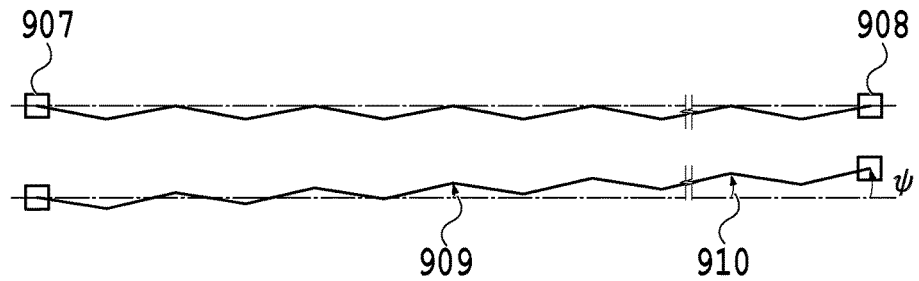
FIG.9E

IMAGE FORMING APPARATUS AND CONTROL METHOD OF IMAGE FORMING APPARATUS

BACKGROUND OF THE INVENTION

Field of the Invention

The present invention relates to a technique of image formation in which exposure is performed by use of an exposure head (hereinafter referred to as an LED head) provided with a light emitting element such as an LED (Light Emitting Diode).

Description of the Related Art

Regarding an electrophotographic printer (i.e., image forming apparatus), a method of forming a latent image by exposing a photoconductive drum using an LED head is commonly known. The LED head has a configuration including a light emitting element array arranged in the main scanning direction (i.e., direction parallel to the rotation axis of the photoconductive drum) and a rod lens array for imaging illuminated light from the light emitting element array on the photoconductive drum. A printer using such an LED head has less parts to be used, compared to a laser scanning type printer that performs scanning by deflecting a laser beam from a semiconductor laser element by use of a rotating polygon mirror. Therefore, cost reduction is easier. Furthermore, since the optical path length of exposure light can be shortened, downsizing of the apparatus is possible.

Some of the printers using such an LED head have a configuration in which the light emitting element array arranged in the main scanning direction is divided into multiple blocks at a constant interval and the light emitting elements are controlled to sequentially emit light in a simultaneous and parallel manner on a block basis. In Japanese Patent Laid-Open No. 2014-108546, regarding such a printer, a technique of controlling the direction of sequential light emission of each block to be inverse with respect to adjacent blocks, so as to reduce misalignment in the sub-scanning direction, which occurs at the position corresponding to the boundary of the divided blocks, is used.

In a case where the direction of sequential light emission of each block is controlled to be inverse with respect to adjacent blocks, a latent image that would otherwise be in a linear shape shifts in the sub-scanning direction alternately for each divided block due to rotational movement of the photoconductor. Accordingly, there may be a case in which the linearity of a latent image line in the main scanning direction is decreased.

SUMMARY OF THE INVENTION

An image forming apparatus according to an aspect of the present invention includes a photoconductor and a light emitting unit, the photoconductor being configured to rotate in a sub-scanning direction, the light emitting unit including a plurality of light emitting elements arranged in line in a direction substantially parallel to a rotation axis of the photoconductor, the light emitting unit being configured to cause the plurality of light emitting elements arranged in line to sequentially emit light to form a latent image on the photoconductor, the image forming apparatus including: a generating unit configured to generate correction data used for correcting a shift in the sub-scanning direction of the latent image to be formed on the photoconductor by at least two of the plurality of light emitting elements; a correcting unit configured to correct image data based on the correction data generated by the generating unit; and a control unit configured to control light emission of the light emitting unit so as to form the latent image on the photoconductor, the latent image corresponding to the image data corrected by the correcting unit, wherein the generating unit is configured to generate the correction data based on configuration information of the light emitting unit, information indicating time required for causing the plurality of light emitting elements to emit light, and information indicating a rotation speed of the photoconductor.

Further features of the present invention will become apparent from the following description of exemplary embodiments with reference to the attached drawings.

BRIEF DESCRIPTION OF THE DRAWINGS

FIGS. 6A and 6B are diagrams for explaining a direction of sequential light emission of an LED chip;

FIGS. 9A through 9E are diagrams illustrating a method of determining a shift amount in the sub-scanning direction with respect to the latent image;

DESCRIPTION OF THE EMBODIMENTS

Hereinafter, modes for carrying out the present invention are explained with reference to the drawings. It should be noted that the following embodiments do not limit the present invention according to the claims. Further, it should be noted that all combinations of features explained in the present embodiments are not necessarily essential to the solution proposed in the present invention. It should be noted that explanation of the same component is given with the same reference sign.

First Embodiment

<Configuration of Image Forming Apparatus>

Figure 1:
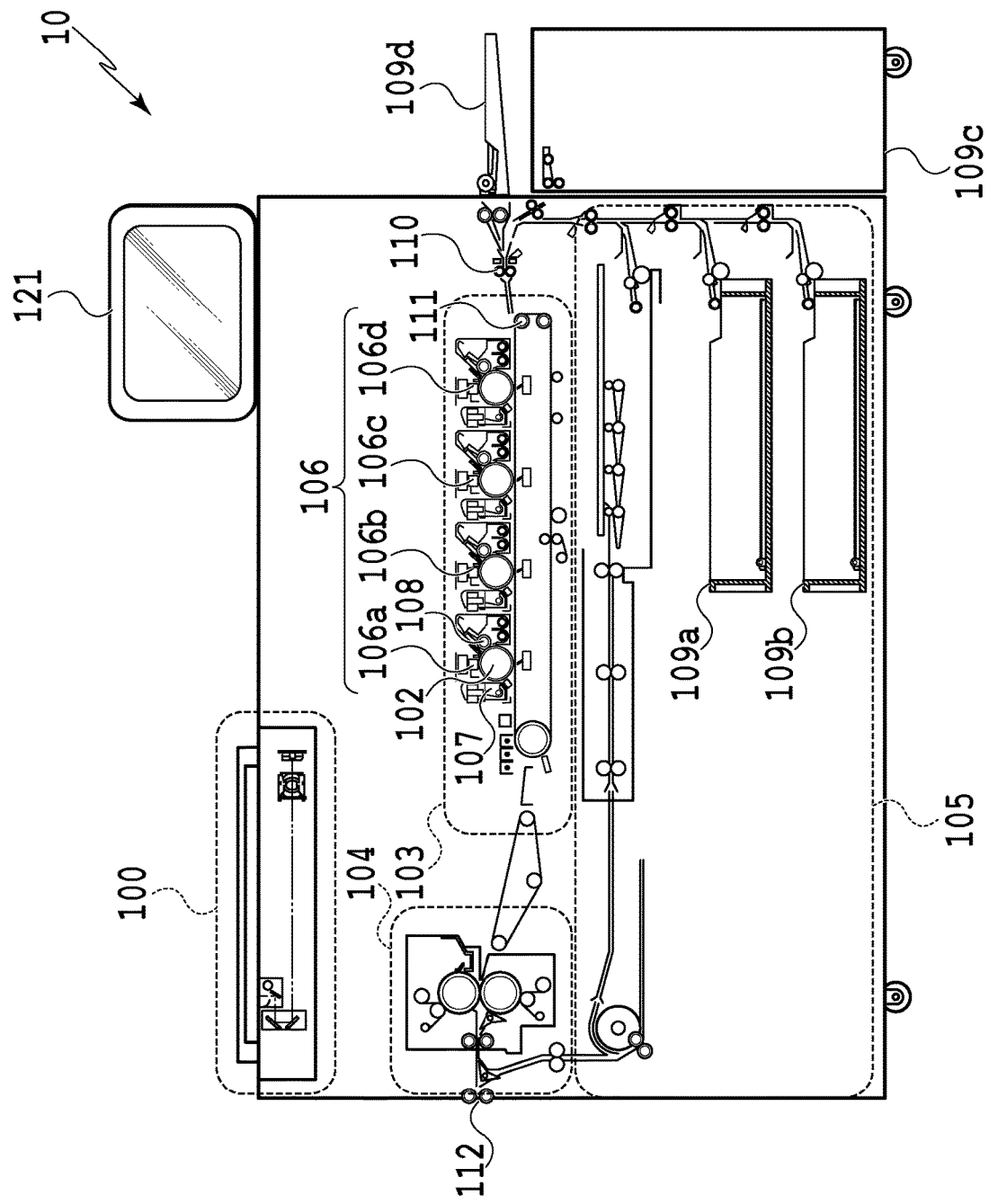
FIG. 1 is a diagram illustrating an overall configuration of an image forming apparatus.

FIG. 1 is a diagram illustrating a configuration of an image forming apparatus 10 according to the present embodiment. The image forming apparatus 10 includes a scanner unit 100, an image forming unit 103, a fixing unit 104, a sheet feeding/conveying unit 105, a system controller unit 120 (not illustrated in FIG. 1) that controls the above units, and an operation unit 121.

The scanner unit 100 irradiates a document placed on a platen with light to optically read an image of the document and converts the read image into electrical signals to create image data.

The image forming unit 103 includes a photoconductive drum 102, an exposure head 106, a charger 107, a developer 108, and a transfer belt 111. The image forming unit 103 drives the photoconductive drum 102 to rotate and charges the photoconductive drum 102 by use of the charger 107. An LED element array is arranged in the exposure head 106. The exposure head 106 causes an LED element (i.e., light emitting element) to emit light according to image data and concentrates the light emitted from the chip surface of the LED element array on the photoconductive drum 102 by use of a rod lens array, so as to form an electrostatic latent image. The developer 108 develops a toner image corresponding to the electrostatic latent image formed on the photoconductive drum 102. The developed toner image is transferred onto a sheet conveyed on the transfer belt 111. The image forming apparatus 10 includes four sets of developing units (i.e., developing stations) to perform such a series of electrophotographic processes, so as to achieve color image formation. The four sets of developing units arranged in an order of cyan (C), magenta (M), yellow (Y), and black (K) start image formation at the cyan station and, after a predetermined amount of time elapses, sequentially execute operation of image formation in magenta, yellow, and black.

In the sheet feeding/conveying unit 105, a sheet is fed from a sheet feeding unit predesignated from among the internal sheet feeding units 109a and 109b, the external sheet feeding unit 109c, and the manual sheet feeding unit 109d. The fed sheet is conveyed to a registration roller 110. The registration roller 110 conveys a sheet onto the transfer belt 111 at a timing where the above-described toner image formed by the image forming unit 103 is transferred onto the sheet. The fixing unit 104 is configured with a combination of rollers and incorporates a heat source such as a halogen heater. The fixing unit 104 melts and fixes toner, by use of heat and pressure, on a sheet to which a toner image has been transferred from the transfer belt 111 and discharges the sheet to the outside of the image forming apparatus 10 by a discharging roller 112.

<Configuration of System Controller Unit>

Figure 2:
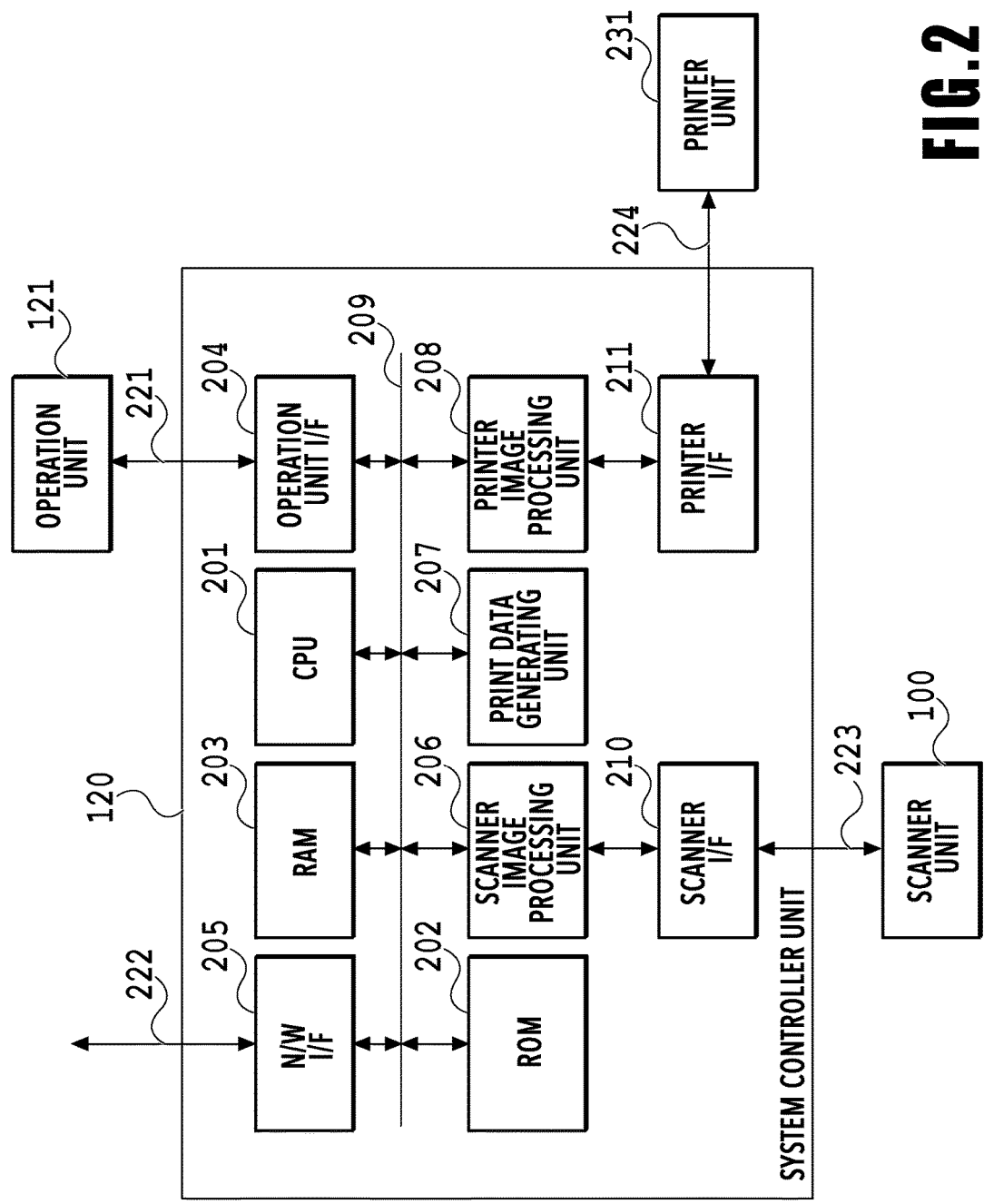
FIG. 2 is a diagram illustrating a configuration of a system controller unit.

FIG. 2 is a diagram for explaining a configuration of the system controller unit 120 according to the present embodiment. The system controller unit 120 includes a CPU (Central Processing Unit) 201, a ROM (Read Only Memory) 202, and a RAM (Random Access Memory) 203. Furthermore, the system controller unit 120 includes an operation unit I/F (Interface) 204, a network I/F 205, a scanner image processing unit 206, a print data generating unit 207, a printer image processing unit 208, a scanner I/F 210, and a printer I/F 211. In accordance with an initial program in the ROM 202, the CPU 201 retrieves a main program from the ROM 202 and stores the main program in the RAM 203. The RAM 203 is used for storing image data, various kinds of setting information data, and the like, in addition to storing a program.

The system controller unit 120 executes control in accordance with an instruction of a job input from the operation unit 121. Further, the system controller unit 120 manages and controls states of the scanner unit 100, the image forming unit 103, the fixing unit 104, and the sheet feeding/conveying unit 105, so that various kinds of jobs are processed smoothly.

The operation unit I/F 204 is used for receiving setting information, etc., of a job designated by a user through the operation unit 121 and for transmitting and receiving various kinds of data for displaying instruction contents on the operation unit 121 in accordance with a display instruction, etc., from the CPU 201. The operation unit I/F 204 and the operation unit 121 are connected via the operation unit communication I/F 221.

The network I/F 205 receives network communication data from the outside of the image forming apparatus 10 and stores the network communication data in the RAM 203. Further, the network I/F 205 notifies the CPU 201 of transmission and reception of data. Furthermore, the network I/F 205 is also used for receiving data in the RAM 203 in accordance with an instruction from the CPU 201 and transmitting the data to an external network. The network I/F 205 is connected to an external network (not illustrated) via the network communication I/F 222.

The scanner image processing unit 206 transmits and receives scanner image data, a control signal, etc., to and from the scanner I/F 210. The received scanner image data is stored in the RAM 203. The scanner image data includes RGB raster image data and attribute data indicating an attribute of each pixel. The scanner I/F 210 receives scanner image data obtained by scanning from the scanner unit 100 via the scanner communication I/F 223. Further, the scanner I/F 210 transmits and receives a scanner control signal.

The print data generating unit 207 receives, via the network I/F 205, print data transmitted by a computer device (not illustrated) or the like connected to an external network and generates raster image data with which print processing can be performed. The generated raster image data is stored in the RAM 203. Print data is data composed of RGB data, CMYK data, or the like, for each of received print jobs.

The printer image processing unit 208 transmits and receives printer image data and a control signal to and from the printer I/F 211. The printer I/F 211 transmits printer image data to the printer unit 231 via the printer communication I/F 224. Further, the printer I/F 211 transmits and receives a printer control signal. The printer image processing unit 208 receives raster image data stored in the RAM 203 and performs image processing to form the data into a data configuration that is suitable for the printer unit 231 to print. Correction of a shift in the sub-scanning direction explained in the present embodiment is performed in the printer image processing unit 208. Details are described below. The printer unit 231 has a configuration including the image forming unit 103, the fixing unit 104, and the sheet feeding/conveying unit 105 in FIG. 1.

The CPU 201, the ROM 202, the RAM 203, the operation unit I/F 204, the network I/F 205, the scanner image processing unit 206, the print data generating unit 207, and the printer image processing unit 208 are connected via a system bus 209.

<Explanation of Exposure Head>

Figure 3A:
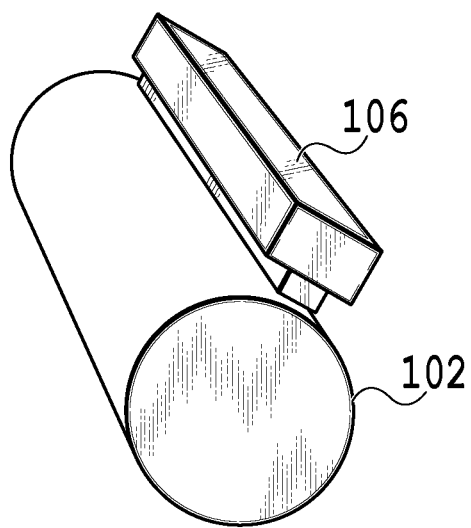
FIGS. 3A and 3B are diagrams illustrating a positional relation between an exposure head and a photoconductive drum.
Figure 3B:
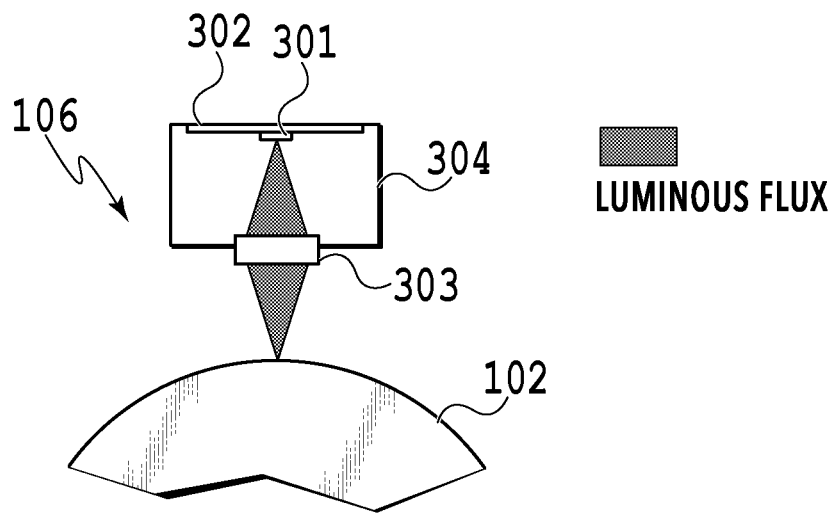

FIGS. 3A and 3B are diagrams for explaining a configuration of an exposure head 106 that performs exposure on a photoconductive drum 102 in the present embodiment. In FIGS. 3A and 3B, a simplified configuration is illustrated. FIG. 3A illustrates an arrangement configuration of the exposure head 106 and the photoconductive drum 102, which is a photoconductor. As explained in FIG. 1, in the image forming unit 103, an exposure head 106 and a photoconductive drum 102 are provided for each color. FIG. 3A illustrates an exposure head 106 and a photoconductive drum 102 corresponding to one of the multiple colors. As illustrated in FIG. 3A, the longitudinal direction of the exposure head 106 extends in a direction parallel to the rotation axis of the photoconductive drum 102. Furthermore, as illustrated in FIG. 3A, the exposure head 106 is arranged at a position where the longitudinal direction thereof is parallel to the rotation axis of the photoconductive drum 102 and where the exposure head 106 is in proximity to the photoconductive drum 102.

In FIG. 3B, a state in which illuminated light from the exposure head 106 is concentrated on the photoconductive drum 102 is illustrated. The exposure head 106 and the photoconductive drum 102 are attached to the image forming apparatus 10 using an attaching member, which is not illustrated. The exposure head 106 includes an LED element array group 301, a printed circuit board 302 on which the LED element array group 301 is mounted, a rod lens array 303, and a housing 304 to which the rod lens array 303 and the printed circuit board 302 are attached. The LED element array group 301, the printed circuit board 302, and the rod lens array 303 extend in the longitudinal direction of the exposure head 106. The photoconductive drum 102 and the rod lens array 303 are arranged such that the distance therebetween defines a predetermined space. Further, the rod lens array 303 and the LED element array group 301 are arranged such that the distance therebetween defines a predetermined space. Each of the predetermined spaces is a space at which illuminated light from the LED element array group 301 is imaged on the photoconductive drum 102. Accordingly, focusing of illuminated light from the LED element array group 301 onto the photoconductive drum 102 is properly performed.

Figure 4A:
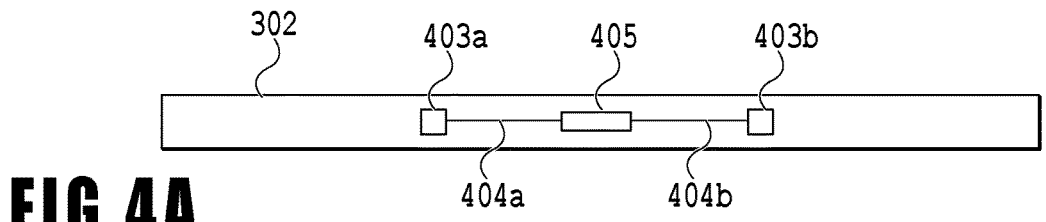
FIGS. 4A through 4D are diagrams illustrating a configuration of a printed circuit board on which an LED element array group is mounted.
Figure 4B:
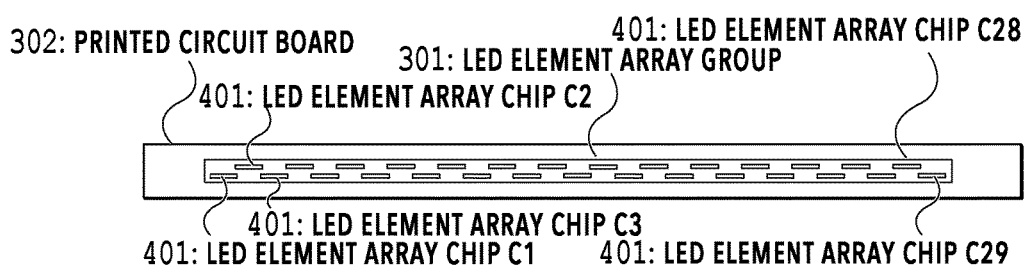

FIGS. 4A through 4D are diagrams for explaining a configuration of the printed circuit board 302 in the present embodiment. FIG. 4A is a diagram illustrating the opposite surface of the board surface on which the LED element array group 301 is mounted (hereinafter referred to as the LED element array non-mounted surface). FIG. 4B is a diagram illustrating the board surface on which the LED element array group 301 is mounted (hereinafter referred to as the LED element array mounted surface). In the present embodiment, the LED element array group 301 has a configuration including 29 LED element array chips 401 arranged as illustrated in FIG. 4B. An LED element array chip 401 includes 516 LED elements (i.e., light emitting elements 412) as light emitting points. Light emitting elements 412 in an LED element array chip 401 are arranged in the longitudinal direction of the chip at a predetermined pitch corresponding to a predetermined resolution. In the example of FIG. 4B, the pitch between light emitting points in each LED element array chip 401 is 21.16 which corresponds to 1200 dpi resolution. Further, the space between the both ends of 516 light emitting points in a chip is approximately 10.9 mm. Since 29 chips are arranged in the LED element array group 301, the number of light emitting elements that can perform exposure is 14964. Accordingly, image formation corresponding to an image width of approximately 316.7 mm in the main scanning direction is possible. The LED element array chips 401 (i.e., C1 to C29) are arranged in two rows in a staggered manner as illustrated in FIG. 4B. Further, each row is arranged along the longitudinal direction of the printed circuit board 302. In the present embodiment, an identical chip is used for each LED element array chip 401. Furthermore, chips that are adjacent in a staggered manner are arranged such that the orientations thereof are opposite to each other with respect to the left and right direction.

Figure 4C:
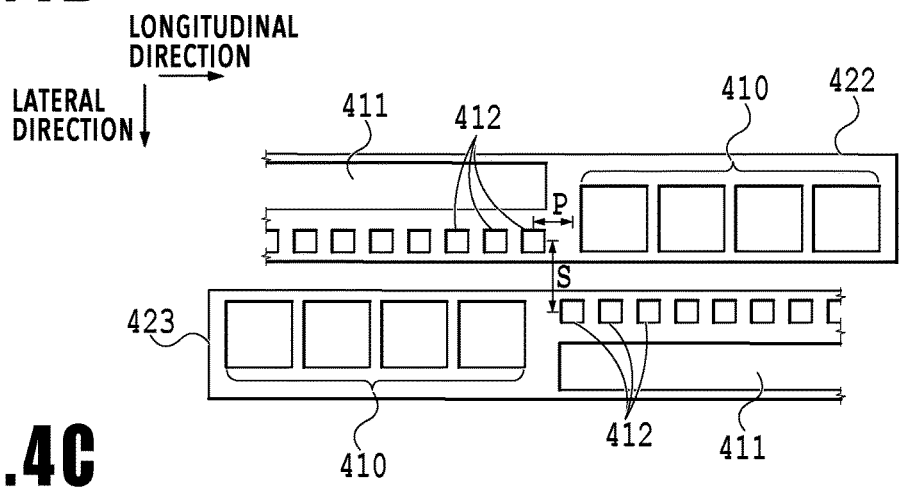

FIG. 4C illustrates the appearance of a boundary part between LED element array chips 401. At an end part of a chip in the longitudinal direction, a wire bonding pad 410 for inputting a control signal is disposed. The transfer unit 411 and the light emitting elements 412 are driven by a signal input from the wire bonding pad 410. At a boundary part between chips, the pitch P in the longitudinal direction between the light emitting elements at an end part of each chip is also 21.16 μm, which corresponds to 1200 dpi resolution. That is, the pitch P in the longitudinal direction between light emitting elements 412 at a boundary part between chips is the same as the pitch between light emitting elements 412 in a chip as well. In addition, the space S in the lateral direction between rows of light emitting elements 412 is arranged to be approximately 84 μm (corresponding to four pixels in a case of 1200 dpi and eight pixels in a case of 2400 dpi).

On the LED element array non-mounted surface, as illustrated in FIG. 4A, a driving unit 403a for driving the LED element array chips 401 (i.e., C1 to C15) and a driving unit 403b for driving the LED element array chips 401 (i.e., C16 to C29) are disposed. The driving unit 403a is connected to an end of the connector 405 via the wiring 404a on the board. The driving unit 403b is connected to the other end of the connector 405 via the wiring 404b on the board. To the connector 405, a signal wire for controlling the driving units 403a and 403b, a power source, a ground wire, and the like, are connected from the printer I/F 211. From the driving units 403a and 403b, wirings for driving LED element arrays are connected to the LED element array chips C1 to C29, respectively, through an inner layer of the printed circuit board 302. Note that, in FIG. 4C, the boundary part between an LED element array chip 422 and an LED element array chip 423 located at the lower right as in FIG. 4B is illustrated. For example, the LED element array chip C2 and the LED element array chip C3 have such a relation as illustrated in FIG. 4C.

Figure 4D:
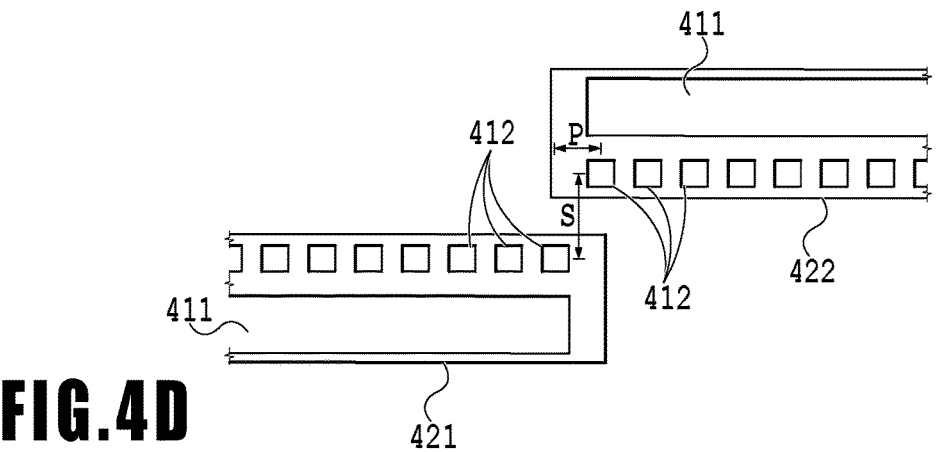

On the other hand, in FIG. 4D, the boundary part between an LED element array chip 422 and an LED element array chip 421 located at the lower left as in FIG. 4B is illustrated. For example, the LED element array chip C2 and the LED element array chip C1 have such a relation. As described above, the LED element array chips are identical chips. Further, chips that are adjacent in a staggered manner are arranged such that the orientations thereof are opposite to each other with respect to the left and right direction. Therefore, unlike in FIG. 4C, a wire bonding pad 410 is not disposed at the boundary part illustrated in FIG. 4D. In the case of FIG. 4D, as in the case of FIG. 4C, the pitch P in the longitudinal direction between the light emitting elements at an end part of each chip is also 21.16 μm, which corresponds to 1200 dpi resolution. Further, the space S in the lateral direction is arranged to be approximately 84 μm as well.

As illustrated in FIG. 4C, the LED element array chip 422 and the LED element array chip 423 are arranged such that each light emitting elements array 412 is adjacent to the other chip in the lateral direction. Further, as illustrated in FIG. 4D, the LED element array chip 421 and the LED element array chip 422 are arranged such that each light emitting elements array 412 is adjacent to the other chip in the lateral direction as well. That is, each light emitting elements array 412 is arranged in such a positional relation with another array as facing each other along the longitudinal direction of the printed circuit board 302.

Note that, in FIG. 4B, for simplicity of explanation, the staggered overlapping conditions of LED element array chips 401 along the longitudinal direction of the printed circuit board 302 are illustrated equally. However, as illustrated in FIGS. 4C and 4D, it is only required that light emitting elements 412 of LED element array chips 401 are arranged in a staggered manner at an equal pitch. That is, as illustrated in FIGS. 4C and 4D, the staggered overlapping conditions of LED element array chips 401 may not be equal.

A latent image formed by an exposure head 106 (i.e., LED head) using such an LED element array group 301 as described above is bent in a different manner, compared to a latent image formed by laser exposure in which scanning is performed by deflecting a laser light from a semiconductor laser element by use of a rotating polygon mirror. Therefore, in the present embodiment, positional correction in the sub-scanning direction in consideration of light emission control of the LED element array group 301 is performed. Details are described below.

Figure 5:
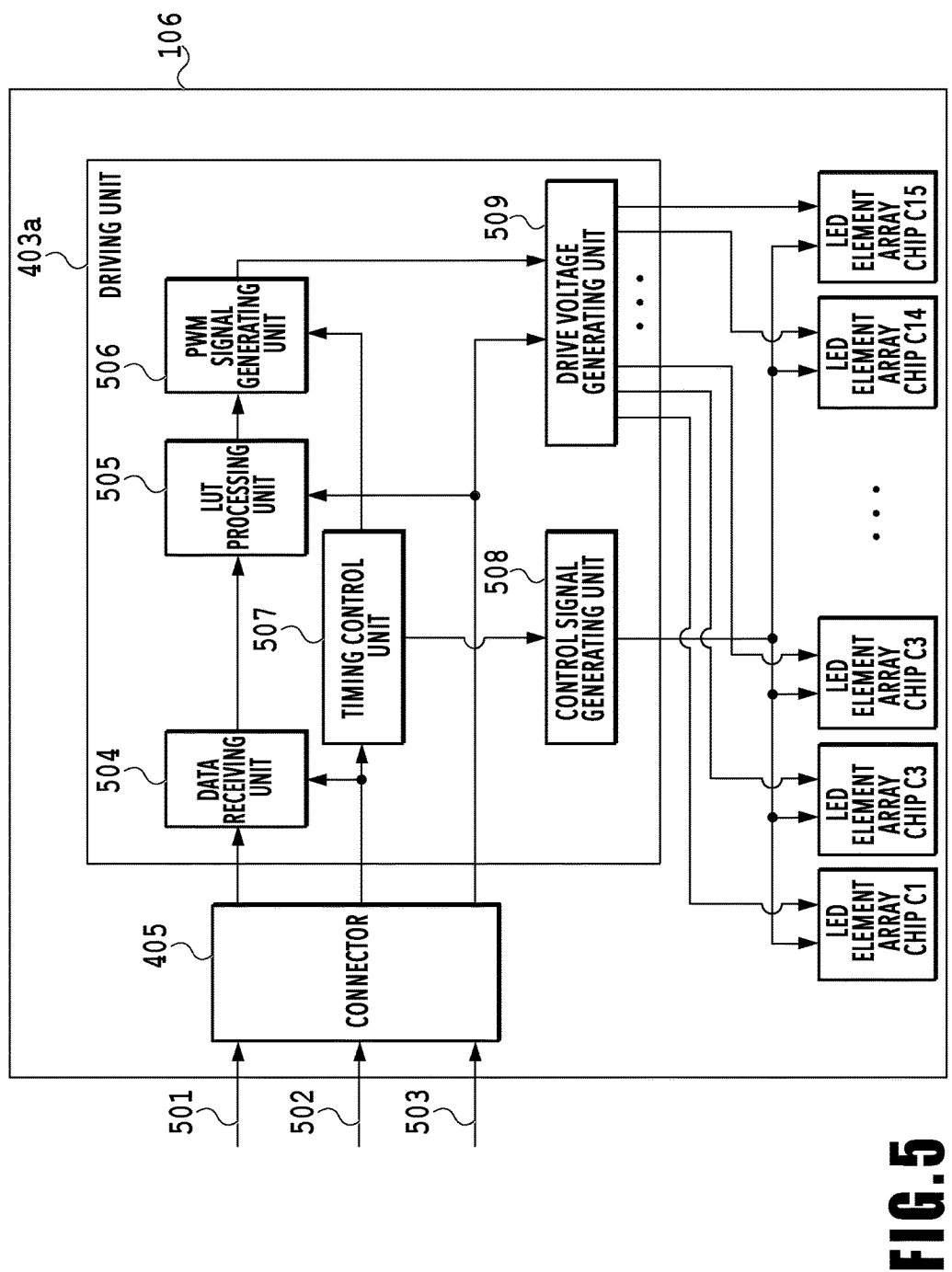
FIG. 5 is a block diagram illustrating a control circuit of the exposure head.

FIG. 5 is a block diagram of a control circuit of the exposure head 106 in the present embodiment. Here, explanation is given of the LED element array chips 401 (i.e., C1 to C15) and the driving unit 403a, although the same applies to the LED element array chips 401 (i.e., C16 to C29) and the driving unit 403b. Furthermore, for simplicity of explanation, only processing for a single color is explained here, although the same processing is performed simultaneously for four colors. As illustrated in FIG. 5, the driving unit 403a includes a data receiving unit 504, an LUT (Look-Up Table) processing unit 505, and a PWM (Pulse Width Modulation) signal generating unit 506. Furthermore, the driving unit 403a includes a timing control unit 507, a control signal generating unit 508, and a drive voltage generating unit 509.

The exposure head 106 receives signals for controlling the exposure head 106 from the printer I/F 211. The signals are image data, a line synchronization signal, and a CPU I/F signal, which are input to the connector 405 on the exposure head 106 via signal transmission cables 501, 502 and 503. Note that, in the present embodiment, a signal received from the printer I/F 211, that is, a signal transmitted from the printer image processing unit 208, is a signal that has been processed such that a shift in the sub-scanning direction is corrected. In the following, operation of the exposure head 106 and a latent image to be exposed in a case of using a signal without correction of a shift in the sub-scanning direction is explained first. Then, details of the processing of correcting a shift in the sub-scanning direction will be explained.

Below is an explanation of processing in the driving unit 403a. The data receiving unit 504 receives a signal transmitted from the printer I/F 211. Here, it is assumed that the data receiving unit 504 transmits and receives image data on a line by line basis in synchronization with a line synchronization signal. That is, the driving unit 403a receives line image data corresponding to LED element array chips 401 (i.e., C1 to C15). Further, the driving unit 403b receives line image data corresponding to LED element array chips 401 (i.e., C16 to C29) out of the same line data in synchronization with the same line synchronization signal.

Next, the LUT processing unit 505 performs a process of converting a data value of each pixel received by the data receiving unit 504 by use of a look-up table. Specifically, in consideration of response characteristics of time for light emission by LED element arrays, a data value is converted such that an accumulated light amount for pulsed light emission becomes a predetermined value. For example, in a case where an accumulated light amount is smaller than a target value due to a slow response, the data value is converted into a greater value. In a case where an accumulated light amount is greater than a target value due to a quick response, the data value is converted into a smaller value. In the present embodiment, it is assumed that a value of the conversion table, which is set in the look-up table, is set based on experimentally obtained response characteristics of an LED element array. Furthermore, it is assumed that, in the conversion table, a predetermined value is set by the printer control unit via the CPU I/F at a given timing before starting image formation. A data value converted by the LUT processing unit 505 is transmitted to the PWM signal generating unit 506.

Next, the PWM signal generating unit 506 generates a pulse width signal (hereinafter referred to as a PWM signal) corresponding to light emission duration during which an LED element array emits light within one pixel section according to a data value. The timing at which the PWM signal generating unit 506 outputs a PWM signal (i.e., drive signal) is controlled by the timing control unit 507. The timing control unit 507 generates, from a line synchronization signal, a synchronization signal corresponding to the pixel section of each pixel and transmits the synchronization signal to the PWM signal generating unit 506. A pixel section is the section of a pixel corresponding to a light emitting element 412 (i.e., LED element) arranged in an LED element array chip 401.

The drive voltage generating unit 509 generates a drive voltage for driving an LED element array chip 401 in synchronization with a PWM signal. The drive voltage generating unit 509 has a configuration in which a voltage level of an output signal can be adjusted by the CPU I/F so as to obtain a predetermined light amount. For example, the drive voltage generating unit 509 is configured to be capable of adjusting a voltage level of an output signal from 5V so as to obtain a predetermined light amount.

Next, with the shift thyristor operation in the present embodiment, light emitting elements 412 in LED element array chips 401 are driven sequentially according to drive voltage. The control signal generating unit 508 generates a control signal to be transferred to a shift thyristor for each pixel, based on a synchronization signal corresponding to a pixel section, which is generated by the timing control unit 507.

<Explanation of Self-Scanning Driving>

FIGS. 6A and 6B are diagrams for explaining self-scanning driving of LED element array chips 401 by shift thyristor control. FIG. 6A is a schematic diagram of self-scanning driving. In an LED element array chip 401, a shift thyristor circuit 601 is included. Further, in the LED element array chip 401, light-emitting elements 412 controlled to emit light by a shift thyristor using the shift thyristor circuit 601 are included as an LED element array. The shift thyristor circuit 601 sequentially shifts power supply to each light emitting thyristor having a p-n-p-n structure, which functions as a light emitting element, for example. In accordance with control signals from the shift thyristor circuit 601, light emitting elements 412 in an LED element array chip 401 are controlled to sequentially emit light from the light emitting element on an end part of the chip to the light emitting element on the other end part. For example, the light emitting elements 412 are controlled to sequentially emit light from left to right as illustrated in FIG. 6A. Note that, as illustrated in FIGS. 4C and 4D, an LED element array chip 401 mounted on the printed circuit board 302 is mounted in an opposite orientation (inversely with respect to the left and right direction), compared to an adjacent LED element array chip. Therefore, regarding adjacent LED element array chips 401, directions of light emitting order are opposite to each other as well. FIG. 6B illustrates that adjacent LED element array chips 401 sequentially emit light in directions opposite to each other. The LED element array chip row 602 in FIG. 6B is a row of LED element array chips 401 controlled to sequentially emit light leftward in the main scanning direction (i.e., leftward in FIG. 6B). The LED element array chip row 603 in FIG. 6B is a row of LED element array chips 401 controlled to sequentially emit light rightward in the main scanning direction (i.e., rightward in FIG. 6B).

As described above, in the exposure head 106 (i.e., LED head) explained in the present embodiment, adjacent LED element array chips 401 sequentially emit light in directions opposite from each other. Furthermore, as explained in FIG. 5, LED element array chips 401 are respectively controlled to emit light simultaneously and parallelly by control signals from the driving units 403a and 403b.

<Explanation of Exposure Latent Image Using Exposure Head 106>

Figure 7A:
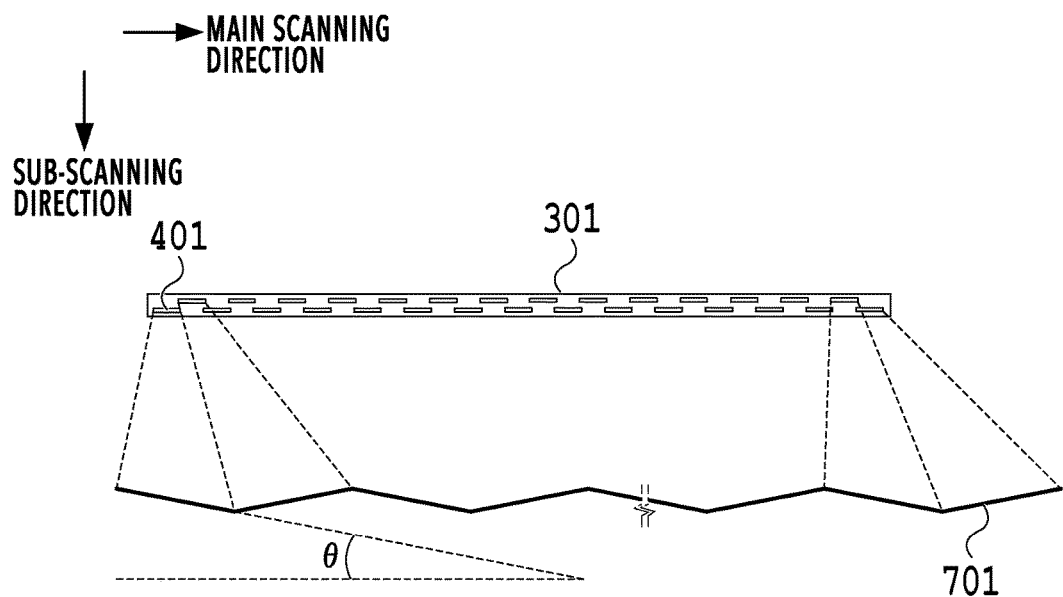
FIGS. 7A and 7B are diagrams illustrating a shift in a sub-scanning direction with respect to a latent image formed by exposure.
Figure 7B:
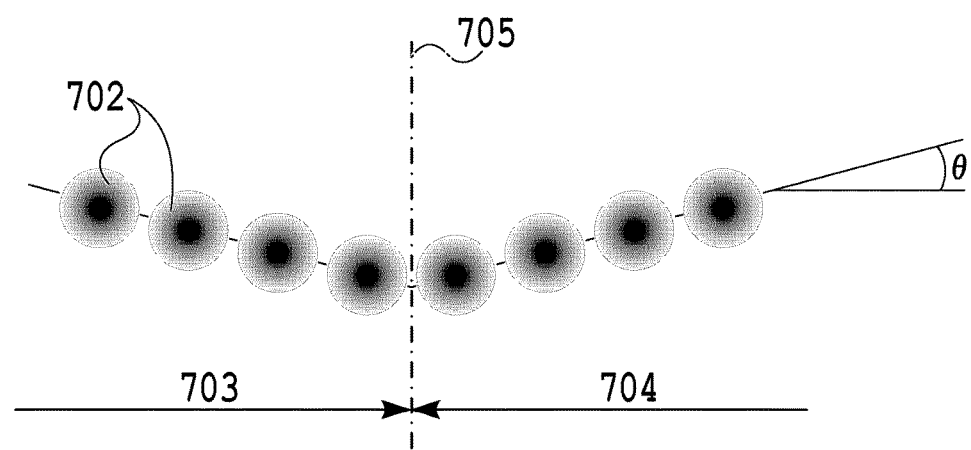

FIGS. 7A and 7B are diagrams for explaining a shift in an exposure latent image formed on a photoconductive drum 102 by the exposure head 106. The LED element array chips 401 in the exposure head 106 are controlled to emit light simultaneously and parallelly in a predetermined amount of time T (sec) such that adjacent LED element array chips 401 emit light in directions opposite from each other. The predetermined amount of time T is an amount of time required for exposure per line. Since the 29 LED element array chips 401 in the exposure head 106 are respectively controlled to emit light simultaneously and parallelly, an amount of time required for 516 light emitting elements in each of the LED element array chips 401 to emit light from an end part to the other end part is the predetermined amount of time as well. Therefore, a latent image in a case where the exposure head 106 forms an exposure latent image on the photoconductive drum 102 is as illustrated in FIG. 7A.

FIG. 7A illustrates a latent image 701 formed on a photoconductive drum 102 by exposing one line using an LED element array group 301. FIG. 7A illustrates a state in which a peak part (i.e., upward convex in the drawing) and a valley part (i.e., downward convex in the drawing) periodically appear in the sub-scanning direction. Note that, for ease of understanding, the latent image 701 formed by the LED element array chips 401 is enlarged in the illustration. The latent image 701 is a latent image in a case of performing exposure on the photoconductive drum 102, based on image data for one line. As indicated by the latent image 701 of FIG. 7A, each line segment of the latent image which slopes downward or upward to the right corresponds to the part exposed by an LED element array chip 401.

Note that, as explained with reference to FIGS. 4C and 4D, in the present embodiment, light emitting elements of respective LED element array chips 401 are shifted from each other by a space S in the sub-scanning direction such that light emitting elements are arranged in a staggered manner in the main scanning direction. Therefore, in a case where each LED element array chip emits light at the same time, such a latent image as illustrated in FIG. 7A is not actually formed (i.e., a latent image shifted in a staggered manner is formed). In the present embodiment, it is assumed that the LED element array chip row 602, which is controlled to emit light sequentially to the left in the main scanning direction, and the LED element array chip row 603, which is controlled to emit light sequentially to the right in the main scanning direction, are controlled to emit light at respective timings considering to shift corresponding space S. For example, in a case where the resolution is 1200 dpi, the space S corresponds to four lines. That is, the LED element array chip row 602 and the LED element array chip row 603 are controlled to emit light based on data of four lines away from each other at the same time. Specifically, timings for the timing control unit 507 to output a synchronization signal for the LED element array chip row 602 and the LED element array chip row 603 are shifted from each other by the amount of time corresponding to the space S. Note that the method of shifting the timings is not limited to the above, and other methods may be used.

The angle θ illustrated in FIG. 7A is the inclination of the latent image relative to the main scanning direction. In a case where light emitting elements in LED element array chips 401 sequentially emit light during the predetermined amount of time T, the photoconductive drum 102 moves (i.e., rotates) at a peripheral speed V (mm/sec) in the sub-scanning direction. Accordingly, a latent image formed on the photoconductive drum 102 as illustrated in FIG. 7A is formed with an inclination relative to the main scanning direction. Note that the inclination θ is obtained by Expression (1) below.

$$\theta = \arctan(VT/(516 \text{ (pixels)}/1200 \text{ (dpi)}*25.4)) \qquad \text{Expression (1)}$$

Furthermore, the latent image 701 is an image in which a latent image at the angle θ sloping downward to the right and a latent image at the angle θ sloping upward to the right are alternated at a constant interval for each LED element array chip 401. This is because each LED element array chip 401 includes the same number (i.e., 516) of light emitting elements arranged at a constant interval. Therefore, the latent images formed in the main scanning direction respectively by the LED element array chips 401 are arranged at a constant interval. Furthermore, regarding the sub-scanning direction, since the photoconductive drum 102 moves at a constant peripheral speed, the shift amount in the sub-scanning direction with respect to the latent image exposed by each LED element array chip 401 is equal as well.

FIG. 7B is an enlarged view schematically illustrating a latent image formed by LED element array chips 401. Each of the pixel latent images 702 indicates a pixel latent image exposed by each light emitting element. As illustrated in FIG. 7B, the pixel latent images 702 are formed as a latent image inclined by an angle θ relative to the main scanning direction. In the area 703, there is a latent image sloping downward to the right in the main scanning direction. The area 703 corresponds to an area for a latent image exposed by a predetermined LED element array chip 401 in the LED element array chip row 603, which is controlled to sequentially emit light in the main scanning direction to the right. This is because an area of the photoconductive drum 102 where a latent image is formed changes from the upper side to the lower side of the drawing due to rotation of the photoconductive drum 102. That is, images exposed at later times are formed on the lower side of the drawing. On the other hand, in the area 704, there is a latent image sloping upward to the right in the main scanning direction. That is, there is a latent image exposed by an LED element array chip in the LED element array chip row 602, which is controlled to sequentially emit light in the main scanning direction to the left. The boundary 705 indicates a boundary between the LED element array chips.

As described above, the latent image 701 formed on the photoconductive drum 102 by the exposure head 106 explained in the present embodiment is desirably a straight line but has periodic shifts in the sub-scanning direction. In a case of forming an image on a print sheet by developing and fixing such a latent image, periodic shifts undesirably appear.

Figure 8A:
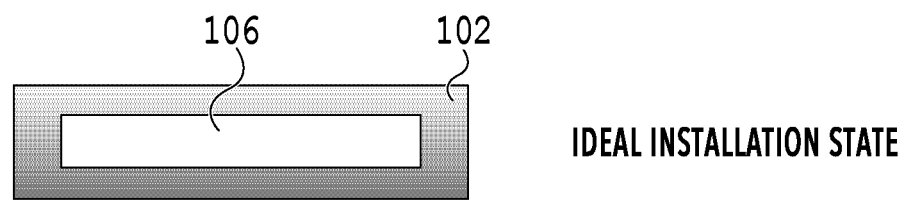
FIGS. 8A and 8B are diagrams for explaining an installation error of the exposure head.
Figure 8B:
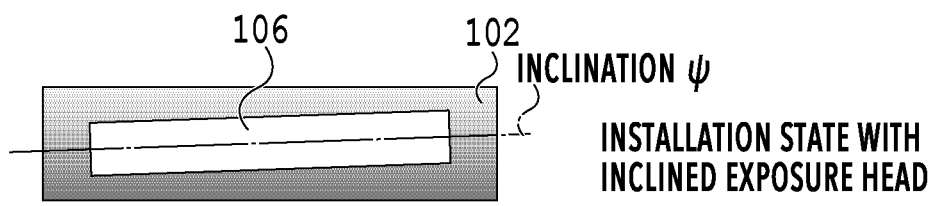

In addition, such a periodic shift in the sub-scanning direction occurs at a developing station of each color. For this reason, in a case of performing color printing by sequentially forming an image at a developing station of each color, color shift phenomenon occurs due to each shift in the sub-scanning direction. Furthermore, in a case where there is an installation error, the color shift phenomenon becomes more prominent. FIGS. 8A and 8B are diagrams for explaining an installation error of the exposure head 106. FIG. 8A is a schematic diagram illustrating a state where the exposure head 106 and the photoconductive drum 102 are set in an ideal manner. FIG. 8B is a schematic diagram illustrating a state with an installation error between the exposure head 106 and the photoconductive drum 102. The exposure head 106 and the photoconductive drum 102 for each color developing station are not necessarily installed in such an ideal manner as illustrated in FIG. 8A. In a case where an installation error as illustrated in FIG. 8B occurs, color shift phenomenon becomes more prominent. In FIG. 8B, even in a case where the installation error is only 0.1°, the shift in the sub-scanning direction is approximately 5.5 mm (i.e., about 26 lines in a case of 1200 dpi).

The following description explains processing of correcting a shift of a latent image in the sub-scanning direction because of the exposure head 106 (i.e., LED head), which causes such color shift phenomenon.

<Positional Shift Amount in Sub-Scanning Direction>

FIG. 9A is a diagram illustrating points (hereinafter referred to as bent points) at which the latent image 701 formed by the exposure head 106 is bent to a different direction. FIG. 9A illustrates multiple bent point 901. As explained above, each of the bent points 901 is a part exposed by a light emitting element at an end part of each LED element array chip 401. The reference point 900 in FIG. 9A is the point exposed by the LED element at the left edge of the latent image 701 in the main scanning direction. Hereinafter, the reference point 900 is regarded as a reference point in the main scanning direction. The area 902 is a section at a bent point where the latent image 701 is convex downward in the drawing. FIG. 9B is an enlarged view of the area 902. The area 903 is a section at a bent point where the latent image 701 is convex upward in the drawing. FIG. 9C is an enlarged view of the area 903. The pixel latent images 904 in FIG. 9B are two pixel latent images on the respective sides of a boundary 705 of LED element array chips. These pixel latent images 904 are pixel latent images exposed by adjacent light emitting elements, each of which is at an end part of one of adjacent LED element array chips 401 and is controlled to emit light lastly in each of the LED element array chips 401. The pixel latent images 905 in FIG. 9C are two pixel latent images similarly on the respective sides of a boundary 705 of LED element array chips. These pixel latent images 905 are pixel latent images exposed by adjacent light emitting elements, each of which is at an end part of one of adjacent LED element array chips 401 and is controlled to emit light firstly in each of the LED element array chips 401. In this way, the pixel latent images 904 and the pixel latent images 905 constituting the bent points 901 are exposed by light emitting elements at the both end parts of LED element array chips 401, respectively. Therefore, line segments including a pixel latent image 904 and a pixel latent image 905 as the end points are formed. It can be said that the latent image 701 is formed by consecutively combining such latent images of line segments in the main scanning direction.

In this way, a result including a shift amount in the sub-scanning direction appears in the latent image 701. That is, a shift amount in the sub-scanning direction with respect to a given pixel position on the latent image 701 exists on a latent image of a corresponding line segment. Therefore, as illustrated in FIG. 9D, a shift amount in the sub-scanning direction can be obtained using distances from the reference point 900 in the main scanning direction. For example, the shift amount in the sub-scanning direction at an exposed point 906 whose distance from the reference point 900 in the main scanning direction is D1 can be obtained by Expression (2) below.

$$VT \times \{(D1-X1)/(X2-X1)\} \qquad \text{Expression (2)}$$

As described above, V represents a peripheral speed, and T represents a time required for exposure per a line. X1 is a distance from the reference point 900 to a pixel latent image 905, which is lighted firstly in the LED element array chip that exposes the exposed point 906. X2 is a distance from the reference point 900 to a pixel latent image 904, which is lighted lastly in the LED element array chip that exposes the exposed point 906.

Similarly, the shift amount in the sub-scanning direction at the exposed point 907 whose distance from the reference point 900 in the main scanning direction is D2 can be obtained by Expression (3) below.

$$VT \times \{(X4-D2)/(X4-X3)\} \qquad \text{Expression (3)}$$

X3 is a distance from the reference point 900 to a pixel latent image 904, which is lighted lastly in the LED element array chip that exposes the exposed point 907. X4 is a distance from the reference point 900 to a pixel latent image 905, which is lighted firstly in the LED element array chip that exposes the exposed point 907.

Note that, in a case where the exposure head 106 itself is installed with inclination relative to the photoconductive drum 102 as illustrated in FIG. 8B, the both end parts 908 and 909 of the latent image 701 are actually measured to obtain the inclination w as illustrated in FIG. 9E, for example. Next, it is possible to calculate shift amounts 909, 910, etc., in the sub-scanning direction, which are caused by inclination w at respective bent points 901.

<Processing of Correcting Positional Shift in Sub-Scanning Direction>

Figure 10:
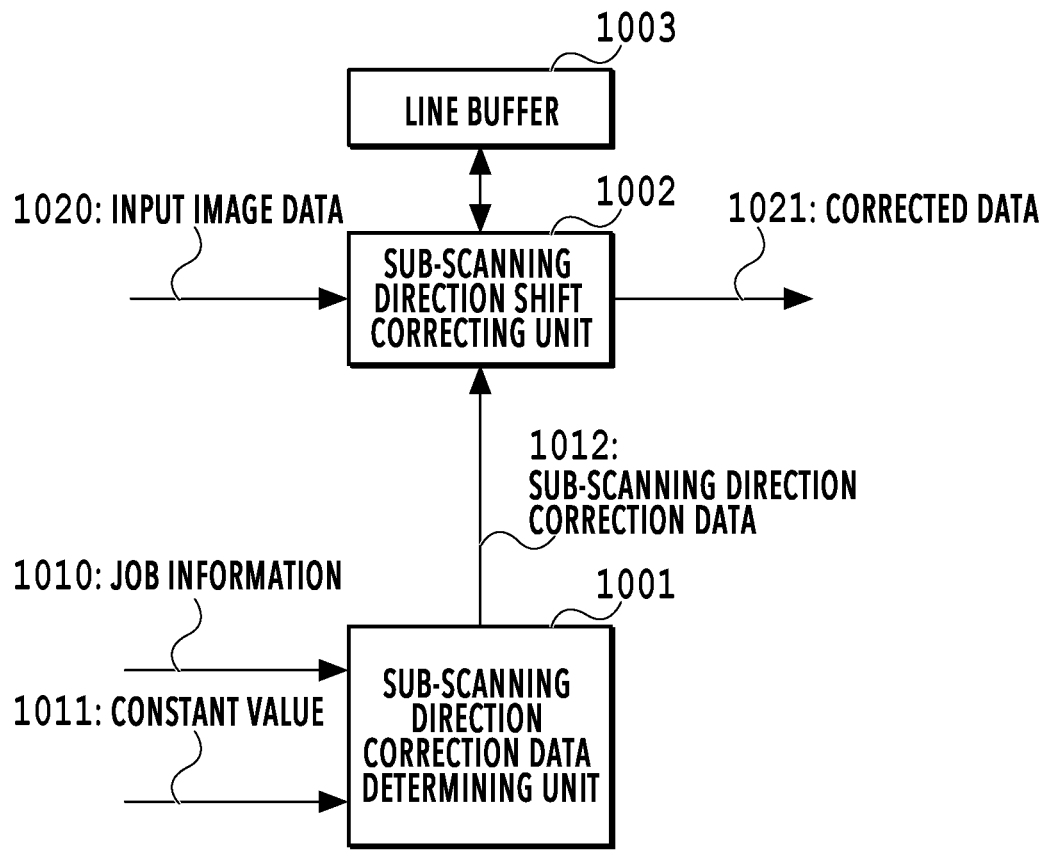
FIG. 10 is a block diagram illustrating a circuit for correcting the shift in the sub-scanning direction with respect to the latent image.

Next, an explanation is given of processing of correcting a positional shift in the sub-scanning direction that is carried out in the present embodiment. FIG. 10 is a diagram illustrating a configuration relating to correction of a positional shift in the sub-scanning direction performed by the printer image processing unit 208 in the system controller unit 120. As illustrated in FIG. 10, the printer image processing unit 208 includes a sub-scanning direction correction data determining unit 1001, a sub-scanning direction shift correcting unit 1002, and a line buffer 1003.

Note that, although processing for a single color is explained in FIG. 10 for simplicity of explanation, it is assumed that the same configuration is prepared for four colors and processing for four colors are performed in a parallel manner. The sub-scanning direction correction data determining unit 1001 receives job information 1010 and a constant value 1011 and determines sub-scanning direction correction data 1012. The sub-scanning direction correction data 1012 is data indicating a shift amount in the sub-scanning direction with respect to a pixel position in the main scanning direction. Alternatively, the sub-scanning direction correction data 1012 is data indicating a correction amount for correcting a shift amount in the sub-scanning direction with respect to a pixel position in the main scanning direction. The sub-scanning direction correction data 1012 determined by the sub-scanning direction correction data determining unit 1001 is output to the sub-scanning direction shift correcting unit 1002. The sub-scanning direction shift correcting unit 1002 corrects a positional shift in the sub-scanning direction for each pixel of the input image data 1020 using the sub-scanning direction correction data 1012 and outputs corrected data 1021. That is, image data is corrected such that a shift occurring in the sub-scanning direction is canceled. The corrected data 1021 is output to the exposure head 106 through a signal transmission cable 501. Since exposure control is performed in the exposure head 106 using the corrected data 1021, it is possible to reduce a shift in the sub-scanning direction.

The input image data 1020 is input and output via an image data I/F (not illustrated) in the printer image processing unit 208. The line buffer 1003 temporarily stores input image data 1020 input to the sub-scanning direction shift correcting unit 1002. The line buffer 1003 is used for sub-scanning direction shift correction processing. The line buffer 1003 is configured with a volatile memory such as an SRAM.

Job information 1010 is setting information about a job executed in the image forming apparatus 10. For example, in a case of performing copy operation, job information 1010 is setting information of a copy job input to the operation unit 121. In a case of performing print operation, job information 1010 is setting information of a print job input from a computer device (not illustrated) connected to an external network. In the present embodiment, job information 1010 input to the sub-scanning direction correction data determining unit 1001 includes speed information of a photoconductive drum 102 and a print resolution. Speed information of a photoconductive drum 102 is information indicating whether to rotate the photoconductive drum 102 at full speed (e.g., V (mm/sec)) or at half speed (e.g., V/2 (mm/sec)). For example, in a case where a print sheet is thick, it is necessary to slow down sheet conveying speed after the print sheet reaches the photoconductive drum 102 in order to secure the time for fixing developed toner. In such a case, the rotation speed of the photoconductive drum 102 becomes half speed. On the other hand, in a case where a print sheet is thin, the rotation speed becomes full speed since the fixing time can be normal. That is, speed information of a photoconductive drum 102 is information indicating whether to rotate the photoconductive drum 102 at a specified speed or at a speed slower than the specified speed. Here, the print resolution is resolution information of the sub-scanning direction. For example, the print information is information indicative of 600 dpi, 1200 dpi, 2400 dpi, etc.

The constant value 1011 is a value that is constant for each image forming apparatus 10 and includes configuration information of the exposure head 106 and characteristic information of the printer unit 231. Configuration information of the exposure head 106 includes information of the number of light emitting elements per an LED element array chip 401 of the exposure head 106, the sequential light emitting direction for each of the multiple LED element array chips 401, the number of LED element array chips 401, etc. Furthermore, information of the pitch between light emitting elements in the main scanning direction and the space between light emitting elements in the sub-scanning direction in a case of being arranged in a staggered manner as illustrated in FIGS. 4C and 4D may be included. Such information as described above have the same values for exposure heads 106 having the same configuration. Characteristic information of the printer unit 231 includes peripheral speed information (e.g., V (mm/sec)) of a photoconductive drum 102 and installation error information (e.g., a value of inclination Ψ in FIG. 9E) of the exposure head 106. Peripheral speed information of a photoconductive drum 102 is used in combination with speed information of the photoconductive drum 102. Installation error information of the exposure head 106 has a different value individually for every image forming apparatus 10. Such constant values as described above are stored in a memory unit (not illustrated) in advance and are shared in the sub-scanning direction correction data determining unit 1001. Note that the memory unit may be a memory unit provided in the sub-scanning direction correction data determining unit 1001. Alternatively, the memory unit may be the ROM 202. That is, there may be a configuration in which a constant value is stored in the ROM 202 and is retrieved and notified to the sub-scanning direction correction data determining unit 1001 by the CPU 201 every time a job is executed.

Furthermore, as the sub-scanning direction correction data 1012, data including correction values for all pixels in the main scanning direction may be output to the sub-scanning direction shift correcting unit 1002 during execution of a job. Alternatively, there may be a case that information about the pixel position of a target pixel to be processed in the main scanning direction of the input image data 1020 is input to the sub-scanning direction correction data determining unit 1001. In that case, data including the correction value for a pixel corresponding to the target pixel may only be output on a per processing basis as sub-scanning direction correction data 1012 from the sub-scanning direction correction data determining unit 1001 to the sub-scanning direction shift correcting unit 1002. Note that, in a case where there is no change in job information 1010, data indicating a correction value of each pixel in the main scanning direction, which is included in the sub-scanning direction correction data 1012, is common in every line.

As described with reference to FIGS. 9A through 9E, in a case of performing exposure control using the exposure head 106 of the present embodiment, periodicity (i.e., regularity) appears in shifts in the sub-scanning direction. Then, as described with reference to FIGS. 9A to 9E, a shift amount in the sub-scanning direction with respect to a pixel at a predetermined position in the main scanning direction can be obtained by predetermined calculation such as Expression (2) or Expression (3). In addition, parameters necessary for the predetermined calculation are determined based on job information 1010 and a constant value 1011. Therefore, in the present embodiment, a shift amount in the sub-scanning direction with respect to a pixel at a predetermined position in the main scanning direction is output from, for example, a predetermined circuit (i.e., sub-scanning direction correction data determining unit 1001) by inputting job information 1010 and a constant value 1011 (as well as a pixel position in the main scanning direction, if necessary) to the predetermined circuit. Instead of an LED head, in a laser scanning method in which scanning is performed by deflecting a laser beam from a semiconductor laser element by use of a rotating polygon mirror, periodicity (i.e., regularity) does not appear in a shift in the sub-scanning direction due to its characteristics, and a linear shift occurs. Therefore, in a laser scanning method, it is required to store, in a memory unit or the like, data for correcting a shift amount of the sub-scanning direction with respect to a position of each pixel in the main scanning direction. On the other hand, according to the present embodiment, periodicity (i.e., regularity) appears in a shift amount in the sub-scanning direction because of the characteristics of an LED head. Therefore, a circuit for positional correction in the sub-scanning direction can be downsized since a memory unit for storing data for correcting a shift amount is not necessary. Furthermore, in a laser scanning method, in a case of storing data for correcting a shift amount in a memory unit, there may be a case of taking a writing time for writing performed by software. However, in the present embodiment, it is possible to reduce such a processing time.

The following description explains processing of correcting a shift in the sub-scanning direction using sub-scanning direction correction data determined in the above way. As the processing of correcting a shift in the sub-scanning direction, there are processing of correction on a line by line basis and processing of correction of less than one line. The correction performed by the sub-scanning direction shift correcting unit 1002 in FIG. 10 is processing of correction of less than one line. Regarding the processing of correction on a line by line basis, the correction processing has already been performed on the input image data 1020 to be input to the sub-scanning direction shift correcting unit 1002 in FIG. 10. The following description explains each correction.

<Correction on a Line by Line Basis in Sub-Scanning Direction>

Figure 11A:
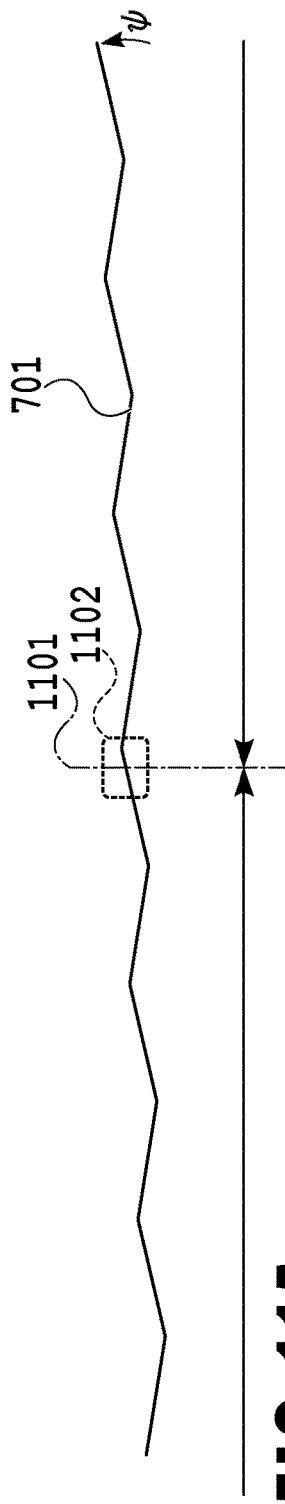
FIGS. 11A through 11C are diagrams illustrating a method of correcting the shift in the sub-scanning direction on a line by line basis.
Figure 11B:
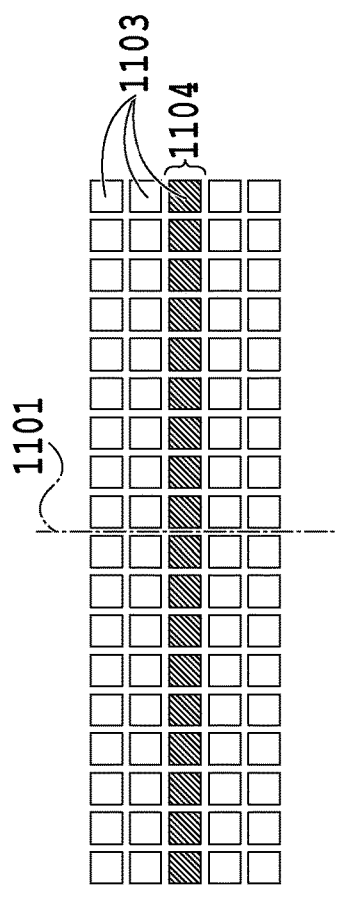
Figure 11C:
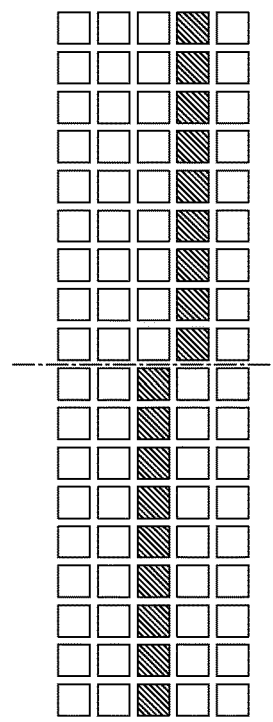

FIGS. 11A through 11C are diagrams for explaining a method for correction on a line by line basis in the sub-scanning direction. In FIG. 11A, it is assumed that the latent image 701 is inclined by inclination w in the direction sloping upward to the right as illustrated in the example of FIG. 8B. Here, with reference to FIG. 11B, an explanation is given of a process in a case where the sub-scanning direction correction data determining unit 1001 determines that correction on a line by line basis is necessary at a main scanning direction pixel position (hereinafter referred to as a line realignment position) 1101 as illustrated in FIG. 11A. Here, an explanation is given of an example of performing correction on a line by line basis by shifting a line downward by one line at the line realignment position 1101 due to the inclination sloping upward to the right as illustrated in FIG. 11A. FIG. 11B is a view illustrating, as raster data, image data on which image processing is performed. It is assumed that FIG. 11B is an enlarged view of the area 1102 of FIG. 11A. It is assumed that FIG. 11B illustrates a state where the image data is stored in the RAM 203. Each of the rectangles 1103 in FIG. 11B represents one pixel. Further, it is assumed that the line of hatched pixels is the target line 1104 on which image processing is performed. Here, as illustrated in FIG. 11C, the target line 1104 of image processing is shifted by one line in the sub-scanning direction in advance, such that the pixels on the right side of the line realignment position 1101 as the boundary are shifted to one line below, and then is input to the sub-scanning direction shift correcting unit 1002. Namely, the above-described processing for correction on a line by line basis is performed at a timing of transferring raster image data stored in the RAM 203 to the sub-scanning direction shift correcting unit 1002. The processing of correction on a line by line basis is performed at a timing of transferring image data. That is, regarding the pixels on the left side of the line realignment position 1101 in FIG. 11B, the original image data in the RAM 203 is transferred. The pixels on the right side of the line realignment position 1101 are replaced with the pixels of one line above, and then image data is transferred. Switching and transferring data at the line realignment position 1101 as described above is referred to as line data realignment processing. The process of transferring an image is performed by a DMAC (Direct Data Access Controller) (not illustrated), which functions as a data transferring unit. Note that such data indicating a line realignment position 1101 is included in the sub-scanning direction correction data 1012. The sub-scanning direction correction data 1012 output from the sub-scanning direction correction data determining unit 1001 is transmitted to the DMAC by an I/F unit (not illustrated) as well and is used for processing of correction on a line by line basis.

<Correction of Less than One Line in Sub-Scanning Direction>

Figure 12A:
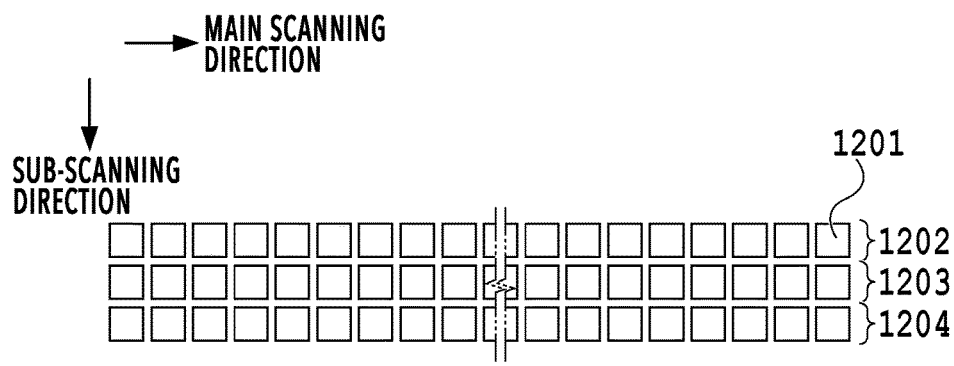
FIGS. 12A through 12D are diagrams illustrating a method of correcting the shift in the sub-scanning direction of less than one line.

FIGS. 12A through 12D are diagrams for explaining a method for correction of less than one line. FIG. 12A illustrates a state of image data for three lines temporarily stored in the line buffer 1003, which is connected to the sub-scanning direction shift correcting unit 1002. The pixel 1201 represents data of each pixel constituting the image data stored in the line buffer 1003. Note that it is assumed that the process of realigning line data on a line by line basis has already been performed by the DMAC on the image data in the line buffer 1003, as explained with reference to FIGS. 11A through 11C. As input image data 1020 input to the sub-scanning direction shift correcting unit 1002, image data for three lines are simultaneously stored in the line buffer 1003 as illustrated in FIG. 12A. The uppermost line data among three lines in the sub-scanning direction (hereinafter referred to as upper line data) is temporarily stored as the line 1202. The middle line data among three lines in the sub-scanning direction (hereinafter referred to as middle line data) is temporarily stored as the line 1203. The lowest line data among three lines in the sub-scanning direction (hereinafter referred to as lower line data) is temporarily stored as the line 1204. In the line buffer 1003, writing and reading of data are performed by a control signal from the sub-scanning direction shift correcting unit 1002. Further, line shifting operation is performed at the timing where processing of one line is ended and processing of the next line is initiated. That is, the lower line 1204 is overwritten with the middle line data, the middle line 1203 is overwritten with the upper line data, and the upper line 1202 is overwritten with new line data. In this way, the line buffer 1003 operates as a three-line buffer in which the pixels of the middle line 1203 are always the target pixels.

Figure 12B:
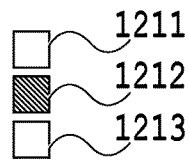

FIG. 12B is a diagram for explaining processing for correction of less than one line using the line buffer 1003 as illustrated in FIG. 12A. The processing for correction of less than one line explained herein is convolution operation processing (i.e., weight movement filtering) using three pixels in total, i.e., one pixel in the main scanning direction multiplied by three lines in the sub-scanning direction. It is assumed that the pixel values of the target pixel 1212, the upper pixel 1211 relative to the target pixel, and the lower pixel 1213 relative to the target pixel are pix_c, pix_u, and pix_l, respectively. Furthermore, in a case where filter coefficients determined in accordance with the sub-scanning direction correction data 1012 (ph_data in this explanation of the operation) are fdata_c, fdata_u, and fdata_l, respectively, the pixel value of the target pixel 1212 can be calculated by Expression (4) below. Note that, since the filter coefficients are determined based on the sub-scanning direction correction data 1012, an array [ ] is used in the expression for explanation. In addition, here, it is assumed that the pixel values and the filter coefficient values correspond to 8-bit gradation.

$$(\text{pix\_}u \times \text{data\_}u[\text{ph\_data}] + \text{pix\_}c \times \text{data\_}c[\text{ph\_data}] + \text{pix\_}l \times \text{data\_}l[\text{ph\_data}])/256 \quad \text{Expression (4)}$$

Figure 12C:
Figure 12D:
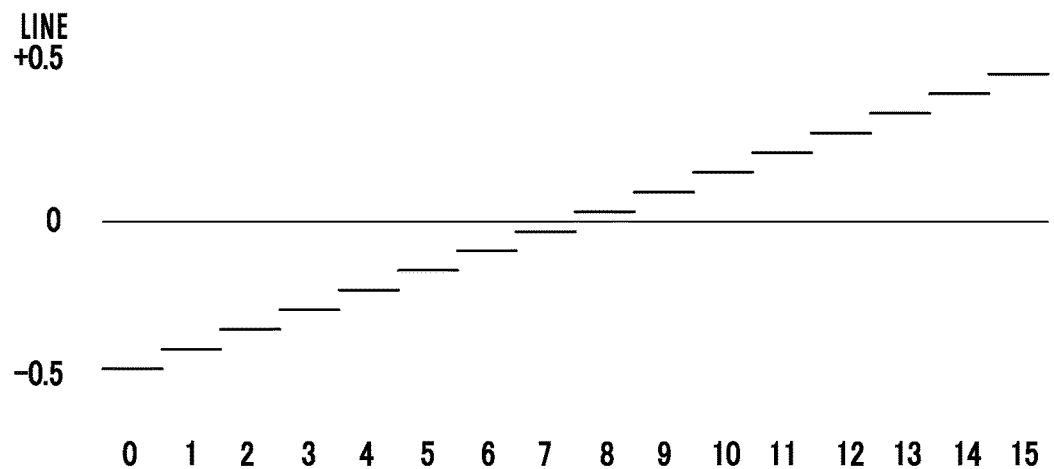

For example, in a case where the sub-scanning direction correction data 1012 is calculated as values for a line divided into 16 levels, an effect of shifting the weight of the target pixels as illustrated in FIG. 12C can be achieved. In a case where a line is divided into 16 levels, each array [ ] includes 16 elements in accordance with the number of divisions. FIG. 12D illustrates a state in which one line is divided into 16 levels. Note that, in the present embodiment, the filter coefficient values correspond to 8-bit gradation while values of 0 or more and 1 or less are used in the filter processing. Therefore, in Expression (4), the value is multiplied by 1/256.

Note that Expression (4) indicates an arithmetic expression for performing processing for correction of less than one line with respect to a target pixel 1212 at a predetermined pixel position in the main scanning direction. By the sub-scanning direction correction data determining unit 1001, parameter ph_data corresponding to the target pixel 1212 at the predetermined pixel position is input as the sub-scanning direction correction data 1012 to the sub-scanning direction shift correcting unit 1002, so that filter processing is performed by use of the parameter. In a case where the sub-scanning direction correction data 1012 includes not only the target pixel 1212 but also data indicating correction values for pixels at all pixel positions in the main scanning direction, parameter ph_data corresponding to the pixel position of the target pixel 1212 is extracted in the sub-scanning direction shift correcting unit 1002. Then, the value is used in Expression (4).

<Flowchart>

Figure 13:
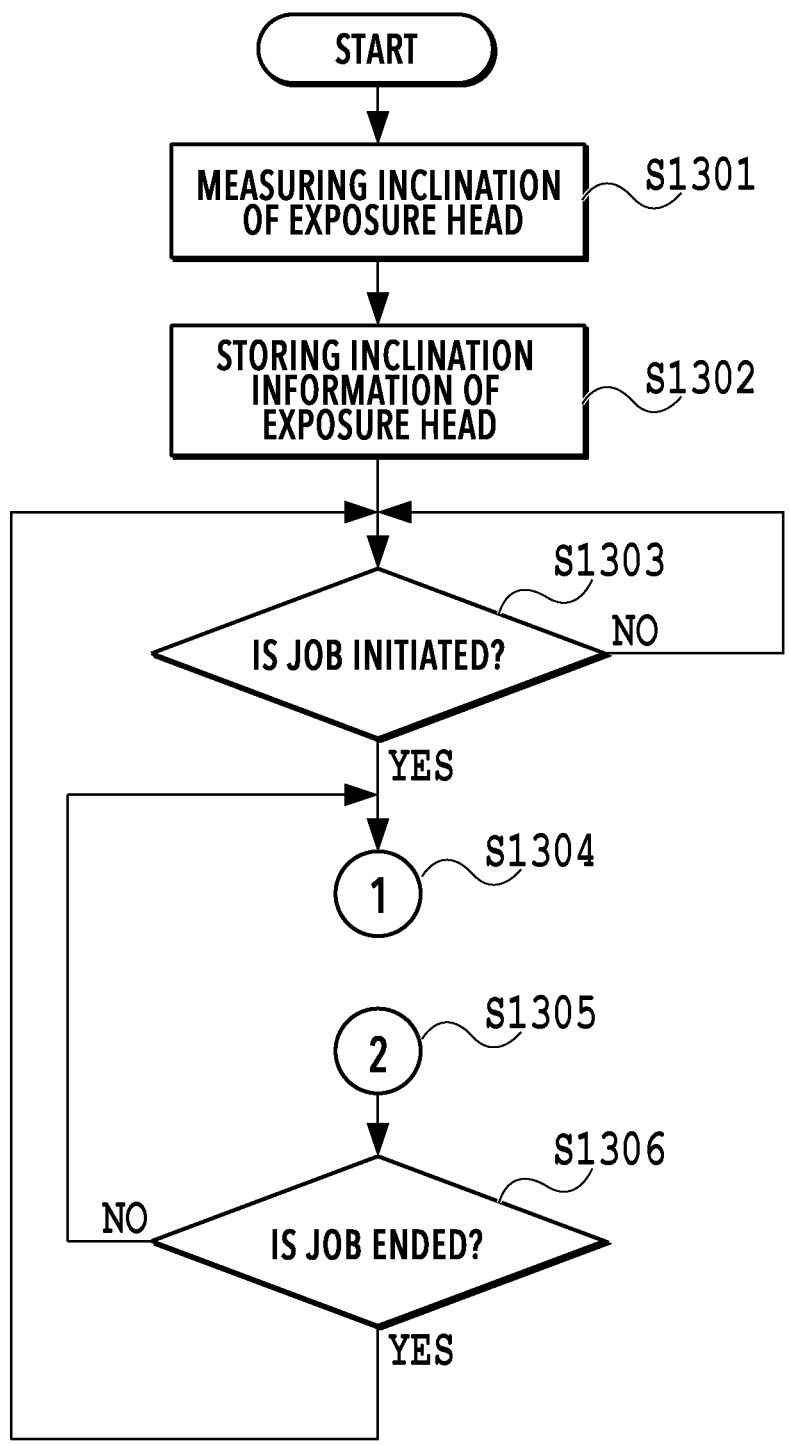
FIG. 13 is a flowchart illustrating an overall control.
Figure 14:
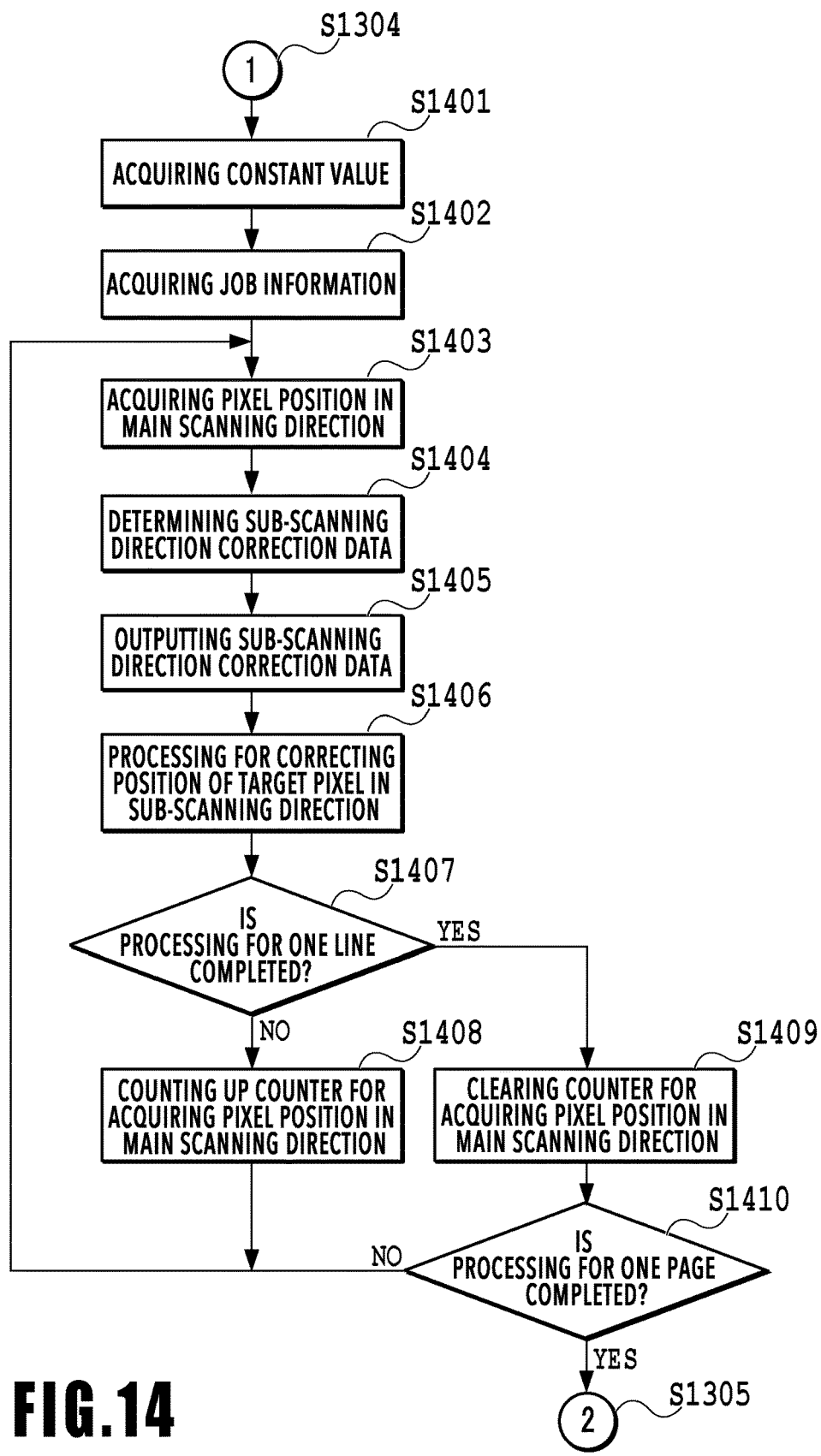
FIG. 14 is a flowchart illustrating a processing flow of correcting the shift in the sub-scanning direction.

With reference to FIG. 13 and FIG. 14, an explanation is given of a control flow in a case of correcting a shift in the sub-scanning direction, which is caused by the exposure head 106 (i.e., LED head) in the image forming apparatus 10 according to the present embodiment. Note that a control program stored in the ROM 202 is loaded into the RAM 203 and executed by the CPU 201 for realizing the flowchart of FIG. 13. Furthermore, it is assumed that the flowchart of FIG. 14 is executed by a sequencer circuit (not illustrated) in the sub-scanning direction correction data determining unit 1001. Note that the sequencer circuit may include a processor and a program to be executed by the processor or may be entirely configured with hardware without a CPU.

In step S1301, as explained in FIG. 8B, the CPU 201 acquires a value obtained by measuring how much inclination relative to a photoconductive drum 102 the exposure head 106 itself is installed with. For example, measurement of inclination is performed by means of measuring difference between positions of light in the sub-scanning direction in a case where the LED elements on the both ends of the exposure head 106 are caused to emit light at the same time. Further, the measurement result is acquired by the CPU 210. Note that the inclination measurement of the exposure head 106 of Step S1301 is performed, for example, at the time of assembly in a factory. Next, in Step S1302, the CPU 201 stores the measured inclination information in a memory unit. Here, the memory unit may be the ROM 202 or may be a memory unit in the sub-scanning direction correction data determining unit 1001. Note that, regarding storage into the memory unit, a value set by an operator via the operation unit 121 may be stored. Alternatively, the measured inclination information may be directly stored via the network I/F 205 or other external I/F by the means of measuring difference between positions in the sub-scanning direction. Next, in Step S1303, the CPU 201 determines whether a job has been initiated. The determination of job initiation may be performed by detecting an operator providing an instruction to execute a job through the operation unit 121. In a case where it is determined that a job has been initiated in Step S1303, the flowchart proceeds to Step S1304.

Here, processing after Step S1304 is explained with reference to FIG. 14. Note that, in FIG. 14, an explanation is given of an example of processing in which sub-scanning direction correction data 1012 for a predetermined pixel in the main scanning direction is determined for each target pixel.

In Step S1401, the sub-scanning direction correction data determining unit 1001 acquires a constant value. That is, the configuration information of the exposure head 106 and the characteristic information of the printer unit 231 are acquired. In step S1402, the sub-scanning direction correction data determining unit 1001 acquires job information of the job being executed. That is, job information including speed information of a photoconductive drum 102 and print resolution is acquired. In Step S1402, information whether peripheral speed of the photoconductive drum 102 is full speed V (mm/sec) or half speed V/2 (mm/sec) is acquired, based on the job information input from the operation unit 121. Next, in Step S1403, the sub-scanning direction correction data determining unit 1001 acquires information of the position of a target pixel 1212 in the main scanning direction. For example, the sub-scanning direction correction data determining unit 1001 acquires information of a pixel position, which is counted by a pixel position counter that counts pixel positions each time a data strobe signal is input. Note that the pixel position counter is mounted in the sub-scanning direction shift correcting unit 1002. Further, the counted pixel position information is acquired by the sub-scanning direction correction data determining unit 1001. Next, in step S1404, the sub-scanning direction correction data determining unit 1001 determines sub-scanning direction correction data for the pixel (i.e., target pixel) at the pixel position corresponding to the pixel position information. It is assumed that the determined sub-scanning direction correction data is different for each job in accordance with job information. The sub-scanning direction correction data determining unit 1001 determines, based on the job information, whether the peripheral speed of the photoconductive drum 102 is full speed V (mm/sec) or half speed V/2 (mm/sec), and determines whether to use sub-scanning direction correction data for the full speed or sub-scanning direction correction data for the half speed. In the present embodiment, since the maximum shift amount in the sub-scanning direction is VT (mm) as explained in FIG. 9D, a shift amount in the sub-scanning direction with respect to the target pixel 1212 is determined based on the maximum shift amount and positional information of the target pixel 1212 in the main scanning direction. For example, the shift amount in the sub-scanning direction is determined using Expression (2) or (3). Then, the sub-scanning direction correction data determining unit 1001 determines sub-scanning direction correction data 1012 for the target pixel, based on the shift amount. Note that the sub-scanning direction correction data 1012 determined herein includes data indicating a correction value used for performing correction on a line by line basis and data indicating a correction value used for performing correction of less than one line.

Next, in Step S1405, the sub-scanning direction correction data determining unit 1001 outputs the determined sub-scanning direction correction data 1012. The data indicating a correction value used for performing correction on a line by line basis is output to the above-described DMAC (not illustrated). The data indicating a correction value used for performing correction of less than one line is output to the sub-scanning direction shift correcting unit 1002. Although not illustrated in FIG. 14, in a case where correction on a line by line basis is performed, the correction processing is performed at a timing where image data is transferred from the DMAC to the sub-scanning direction shift correcting unit 1002.

Next, in Step S1406, the sub-scanning direction shift correcting unit 1002 executes sub-scanning direction shift correction processing on the input image data 1020, based on the sub-scanning direction correction 1012 data input in Step S1405. For example, using Expression (4), processing for correction of less than one line is executed on a target pixel 1212. Next, in Step S1407, the sub-scanning direction correction data determining unit 1001 determines whether processing for one line has been completed. Here, it is possible that the method for determining whether processing for one line has been completed is to determine whether a line end signal has been input along with the input image data 1020, which is input to the sub-scanning direction shift correcting unit 1002. In a case where it is determined in Step S1407 that processing for one line has not been completed, the flowchart proceeds to Step S1408. In Step S1408, the sub-scanning direction correction data determining unit 1001 causes the pixel position counter to count up and prepares for processing of the next pixel. Then, the flowchart returns back to Step S1403, and determination of positional correction in the sub-scanning direction and processing for correction are repeated.

On the other hand, in a case where it is determined in Step S1407 that processing for one line has been completed, the flowchart proceeds to Step S1409. In step S1409, the sub-scanning direction correction data determining unit 1001 clears the pixel position counter and prepares for the pixels of the next line. Next, in Step S1410, the sub-scanning direction correction data determining unit 1001 determines whether processing for one page has been completed. Here, it is possible that the method for determining whether processing for one page has been completed is to determine whether a page end signal has been input along with the input image data 1020, which is input to the sub-scanning direction shift correcting unit 1002. In Step S1410, in a case where it is determined that processing for one page has not been completed, the flowchart returns back to Step S1403, and determination of positional correction in the sub-scanning direction and processing for correction are repeated. In a case where it is determined in step S1410 that processing for one page has been completed, the flowchart proceeds to Step S1305.

Next, returning back to FIG. 13, subsequent processing is explained. In Step S1306, the CPU 201 determines whether the job has been ended. Here, it is determined whether processing for the number of pages of the job instructed from the operation unit 121 has been completed. For example, the printer image processing unit 208 transmits an interrupt signal (not illustrated) to the CPU 201 upon completion of image processing for one page, and the CPU 201 determines that a job has been completed by counting the number of interrupts.

As explained above, according to the present embodiment, it is possible to reduce a positional shift in the sub-scanning direction in an image forming apparatus that performs exposure control to cause light emitting elements to sequentially emit light in different directions on a per block basis. That is, the image forming apparatus 10 of the present embodiment has a configuration that performs exposure control to cause light emitting elements in adjacent LED element array chips 401 to sequentially emit light in opposite directions. Furthermore, in such a configuration as described above, in view of the fact that the amount of positional shift in the sub-scanning direction has periodicity, correction data used for correcting a shift in the sub-scanning direction is determined based on configuration information of the exposure head 106, characteristic information of a photoconductive drum 102, and job information. According to such processing as described above, it is possible to easily correct a positional shift in the sub-scanning direction with respect to each pixel in the main scanning direction. Further, since periodicity appears in an amount of positional shift in the sub-scanning direction, it is possible to determine, by predetermined calculation, a positional shift in the sub-scanning direction for each pixel in the main scanning direction, without a memory unit or the like for storing an amount of positional shift in the sub-scanning direction for each pixel in the main scanning direction. As described above, since it is not necessary to provide a memory unit or the like for storing an amount of positional shift in the sub-scanning direction, a circuit for positional correction in the sub-scanning direction can be downsized. In addition, for such a memory unit, it is necessary to set a period to write a shift amount and software to be used for writing. According to the configuration of the present embodiment, since a memory unit for storing a shift amount is not necessary, it is possible to reduce such a time for writing and such a load for software.

Other Embodiments

For explanation of the above-described embodiment, an image forming apparatus 10 in which an LED element array group 301 is configured by multiple LED element array chips 401 arranged in a staggered manner is taken as an example. However, the present invention may be applied to an image forming apparatus 10 which does not include multiple LED element array chips 401 as described above. For example, an image forming apparatus that performs exposure control using an LED head in which LED light emitting elements are arranged in line in the main scanning direction may be used. Further, in a case where an LED head is divided into multiple blocks and exposure control is performed such that light emitting directions are alternated to be opposite on a per block basis, it is possible to correct a shift in the sub-scanning direction by the same processing as in the above-described embodiment. In this case, configuration information of an exposure head as described above includes information such as the number of light emitting elements per block in the exposure head, a direction in which light emitting elements in each block sequentially emit light, and the number of blocks.

Further, for explanation of the above-described embodiment, a configuration for controlling LED light emitting elements in each of adjacent LED element array chips 401 to emit light in a direction opposite from each other is taken as an example. According to such a configuration as above, misalignment made by adjacent LED element array chips 401 can be reduced. However, the present invention is not limited to the example, and a set of adjacent LED element array chips 401 whose LED light emitting elements emit light in the same direction may be included.

Further, for explanation of the above-described embodiment, an image forming apparatus 10 including developing stations corresponding to four colors of CMYK is described as an example. That is, an image forming apparatus 10 including four photoconductive drums 102 and exposure heads 106 (i.e., four exposure heads) for exposing respective photoconductive drums 102 is taken as an example for explanation. However, the present invention is not limited to the example. A developing station corresponding to a color other than the four colors may be included, or a monochrome developing station may be included.

The present invention can be realized by processing of providing a program for achieving one or more functions of the above-described embodiment to a system or a device via a network or a memory medium, so that one or more processors in a computer of the system or the device retrieve and execute the program. Further, the present invention can be realized by a circuit (e.g., ASIC) for achieving one or more functions as well.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to reduce a positional shift in the sub-scanning direction in an image forming apparatus that performs exposure control to cause light emitting elements to sequentially emit light in a different direction on a per block basis.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-222716, filed Nov. 20, 2017, which is hereby incorporated by reference herein in its entirety.

What is claimed is:

1. An image forming apparatus including a photoconductor and a light emitting unit, the photoconductor being configured to rotate in a sub-scanning direction, the light emitting unit including a plurality of light emitting elements arranged in line in a direction substantially parallel to a rotation axis of the photoconductor, the light emitting unit being configured to cause the plurality of light emitting elements arranged in line to sequentially emit light to form a latent image on the photoconductor, the image forming apparatus comprising:
   a generating unit configured to generate correction data used for correcting a shift in the sub-scanning direction of the latent image to be formed on the photoconductor by at least two of the plurality of light emitting elements;
   a correcting unit configured to correct image data based on the correction data generated by the generating unit; and
   a control unit configured to control light emission of the light emitting unit so as to form the latent image on the photoconductor, the latent image corresponding to the image data corrected by the correcting unit,
   wherein the generating unit is configured to generate the correction data based on configuration information of the light emitting unit, information indicating time required for causing the plurality of light emitting elements to emit light, and information indicating a rotation speed of the photoconductor.

2. The image forming apparatus according to claim 1, wherein the configuration information of the light emitting unit includes information indicating a number of the light emitting elements included in the light emitting unit and information indicating an order in which the light emitting unit causes the plurality of light emitting elements to emit light.

3. The image forming apparatus according to claim 2,
   wherein the photoconductor is configured to rotate at a plurality of rotation speeds, and
   wherein the generating unit generates the correction data for each of the plurality of rotation speeds.

4. The image forming apparatus according to claim 3, wherein the correcting unit is configured to correct the image data by use of one of the correction data generated by the generating unit, the one of the correction data being selected based on the information indicating one of the plurality of rotation speeds of the photoconductor, the one of the plurality of rotation speeds of the photoconductor being selected based on a set value of a job for which execution has been instructed.

5. The image forming apparatus according to claim 1, wherein the correction data includes data indicating a shift amount in the sub-scanning direction at a predetermined position in a main scanning direction or data indicating an amount that should be shifted in the sub-scanning direction at the predetermined position in the main scanning direction.

6. The image forming apparatus according to claim 1, wherein the generating unit is configured to determine a shift amount in the sub-scanning direction of a latent image formed by a given light emitting element included in the plurality of light emitting elements, the shift amount being determined based on a position of a first light emitting element to emit light firstly among the plurality of light emitting elements included in the light emitting unit, a position of a last light emitting element to emit light lastly among the plurality of light emitting elements included in the light emitting unit, a time required to perform exposure according to image data for one line, and the information indicating the rotation speed of the photoconductor.

7. The image forming apparatus according to claim 6,
wherein the image forming apparatus includes a plurality of the light emitting units, and
wherein the generating unit is configured to generate correction data used for correcting the shift amount in the sub-scanning direction of the latent image formed by the given light emitting element included in one of the light emitting units, the correction data being generated further based on information indicating inclination of a direction in which the plurality of light emitting units are arranged relative to the rotation axis of the photoconductor.

8. The image forming apparatus according to claim 7, wherein, with respect to each of adjacent light emitting units, the plurality of light emitting elements included in one of the adjacent light emitting units is configured to sequentially emit light in an opposite direction, compared to that in the other of the adjacent light emitting units.

9. The image forming apparatus according to claim 1, wherein the generating unit generates correction data used for correcting a shift in the sub-scanning direction of a latent image formed by the plurality of light emitting elements corresponding to all pixels in a main scanning direction.

10. The image forming apparatus according to claim 1, wherein the correcting unit is configured to correct a shift of less than one line.

11. The image forming apparatus according to claim 10, wherein the correcting unit is configured to correct a pixel value of a target pixel in the image data by filtering using the pixel value of the target pixel and a pixel value of a pixel adjacent to the target pixel in the sub-scanning direction.

12. The image forming apparatus according to claim 1, wherein, in a case in which an amount of correction based on the correction data exceeds one line, the correcting unit is configured to realign a line of the image data to be transferred to the control unit and to transfer the realigned image data to the control unit.

13. The image forming apparatus according to claim 7,
wherein the control unit is configured to output a plurality of control signals based on a line synchronization signal to the plurality of light emitting units, respectively, and
wherein the control unit controls light emitting elements in a block of each light emitting unit to sequentially emit light in accordance with the corresponding control signal.

14. The image forming apparatus according to claim 1, wherein the light emitting unit corresponds to a chip in which the plurality of light emitting elements are arranged in line.

15. The image forming apparatus according to claim 14, wherein a plurality of the chips are arranged in a staggered manner such that the plurality of the chips are shifted by a predetermined distance in the sub-scanning direction.

16. A control method of an image forming apparatus including a photoconductor and a light emitting unit, the photoconductor being configured to rotate in a sub-scanning direction, the light emitting unit including a plurality of light emitting elements arranged in line in a direction substantially parallel to a rotation axis of the photoconductor, the light emitting unit being configured to cause the plurality of light emitting elements arranged in line to sequentially emit light to form a latent image, the control method comprising:
generating correction data used for correcting a shift in the sub-scanning direction of the latent image to be formed on the photoconductor by at least two of the plurality of light emitting elements;
correcting image data based on the correction data generated in the generating; and
controlling light emission of the light emitting unit so as to form the latent image on the photoconductor, the latent image corresponding to the image data corrected in the correcting,
wherein, in the generating, the correction data is generated based on configuration information of the plurality of light emitting elements included in the light emitting unit, information indicating time required for causing the plurality of light emitting elements to emit light, and information indicating a rotation speed of the photoconductor.

* * * * *